ately, 333-337.
United States Patent [19]
Yerkes et al.

[11] 4,139,890
[45] Feb. 13, 1979

[54] BAR GAUGE PLOTTING AND DISPLAY SYSTEM

[75] Inventors: Ronald W. Yerkes, Orchard Park, N.Y.; Joel L. Hoffner, Johnstown; Tom L. Galanis, Bethlehem, both of Pa.; Richard S. Hostetter, Jr., Orchard Park, N.Y.

[73] Assignee: Bethlehem Steel Corporation, Bethlehem, Pa.

[21] Appl. No.: 778,532

[22] Filed: Mar. 17, 1977

[51] Int. Cl.² .................... B21B 37/00; G06F 15/46
[52] U.S. Cl. ................................ 364/472; 72/37; 364/571
[58] Field of Search .................. 235/151.3, 151.1; 72/37, 8; 29/DIG. 32; 356/158, 160, 167, 159, 156; 358/101, 107

[56] References Cited
U.S. PATENT DOCUMENTS

| 3,676,652 | 7/1972 | Millis, Jr. et al. ............ 235/151.1 X |
| 3,713,313 | 1/1973 | Spradlin ....................... 235/151.1 X |
| 3,968,681 | 7/1976 | Cornforth et al. ............... 73/67.5 R |

OTHER PUBLICATIONS

A Microprocessor–Based Gauge Controller for Metals Rolling Applications; D. M. Hershberger, J. G. Underwood; IEEE Transactions on Industrial Electronics and Control Instrumentation, vol. IECI-22, No. 3, Aug. 1975, pp. 333-337.

Primary Examiner—Edward J. Wise
Attorney, Agent, or Firm—Joseph J. O'Keefe; Michael J. Delaney; George G. Dower

[57] ABSTRACT

Computerized electro-optical system gages two orthogonal dimensions of a moving hot bar and plots cold bar profile. Dual back-lighted electronic camera heads mounted 90° apart on a scanner generate separate bar shadow pulses representing othogonal bar dimensions. Each camera source of bar pulses is processed in individual camera electronics where it is presumed the bar pulse has been corrected for optical and electronic system sources of error. If each bar pulse is not corrected, it is assumed that both a bar size pulse and bar position-in-field-of-view pulse are generated by each camera electronics and fed to a digital computer. The computer is programmed to correct for optical and electronic errors, bar temperature and composition and other errors. Two corrected bar size signals, together with a scanner position signal and a bar aim size signal, are used to plot cold bar profile deviation from aim size. CRT and printing terminals readout and printout bar profile data and interact with the computer.

12 Claims, 48 Drawing Figures

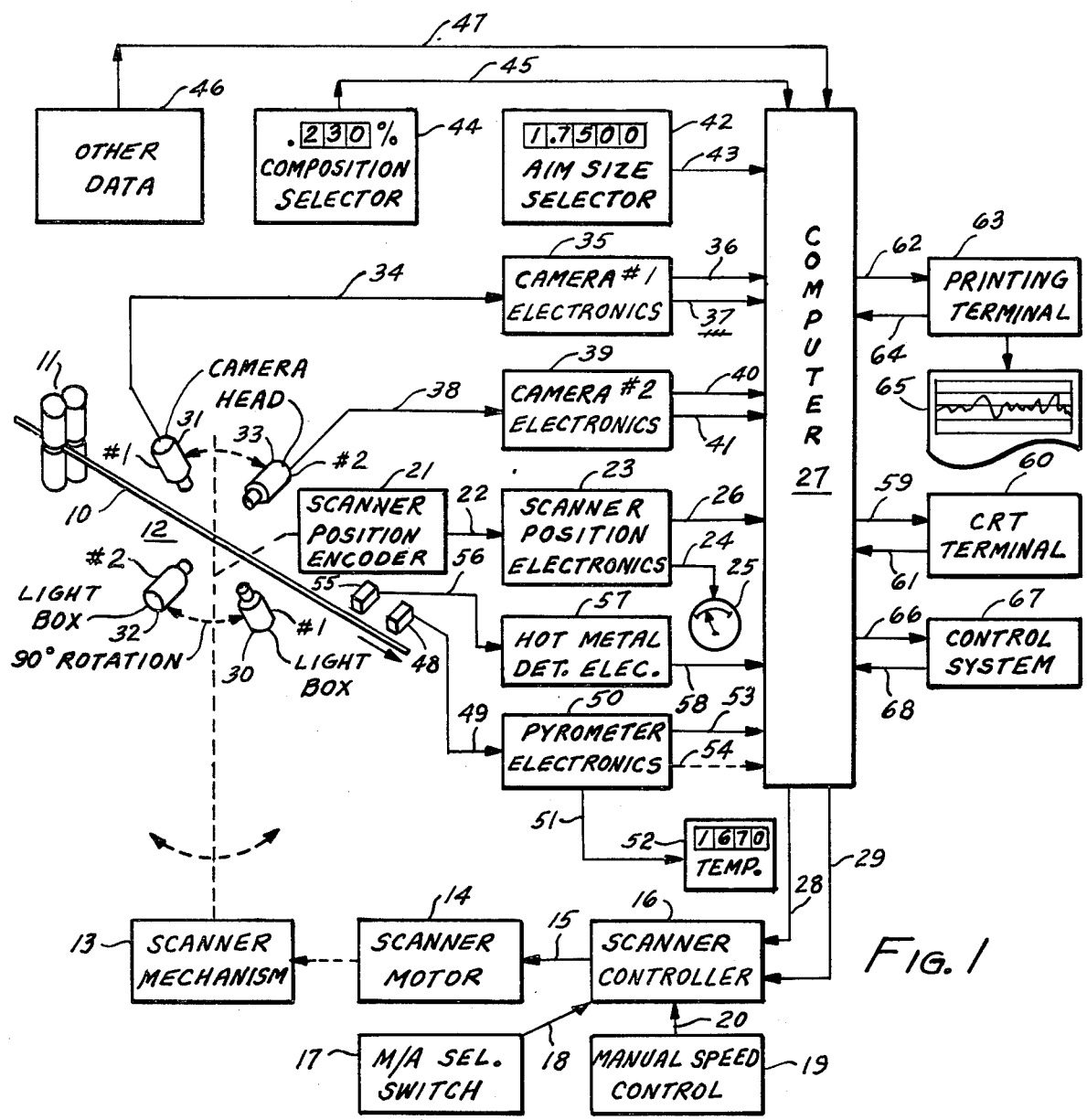
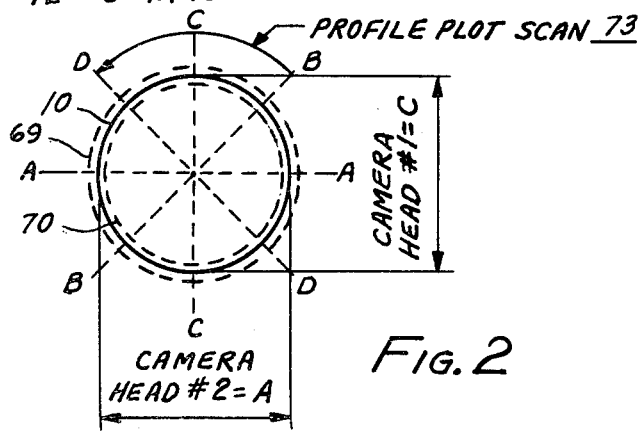
Fig. 1
Fig. 2

OPERATING DATA HEADER

```
  Date      Time                TEMP22 = 1670

AIM  = 1.7500   O/R=0.0115                    %OVER = 48
  CARBON  = 0.230    MIN=1.7422                    %UNDR =  0
  HOTAIM  = 1.7686   MAX=1.7578                    %O/RD = 44
```

```
                                        76
1.7650 - - - - - - - - / - - - - - - - - - - - - - - - - - - -

78          74
                    /           /
1.7580  B  -30   -15   C   15******  D  -30   -15   A   15    30    B
1.7570                         *    **
1.7560                              *
1.7550        ******      *         *  **
1.7540  **         *                *   *  **                         *
1.7530             *      *             *  **  **                    **
1.7520                         75           *  ****    *            **
1.7510             **     *    /                    ***  *****
1.7500 ------------------*----/------------------------------------
1.7490                  *
1.7480                  *
1.7470               *
1.7460                          65
1.7450                          ‾‾
                        79
                        /
1.7420  B  -30   -15   C   15    30  D  -30   -15   A   15    30    B

77
                                /
1.7350 - - - - - - - - - - - / - - - - - - - - - - - - - - - - -
```

COLD-AIM SIZE DEVIATION-INCHES (× 25.4=mm.)

SCANNER ANGULAR POSITION - DEGREES

FIG. 3

HEXADECIMAL CORE MAP

| TYPE | NAME | POSITION IN COMMON AREA | COMMON NAME | CORE LOCATION | DESCRIPTION |
|---|---|---|---|---|---|
| ARRAY | IFLDC1 | 0000 | IN | FCOMP1 | 9700 | HEAD 1 FIELD OF VIEW COMPENSATION MAP |
| VARIABLE | IMULT1 | 0000 | IN | CORCOM | 9900 | HEAD 1 SLOPE CORRECTION |
| VARIABLE | IOFST1 | 0002 | IN | CORCOM | 9902 | HEAD 1 OFFSET CORRECTION |
| VARIABLE | ITMP1 | 0000 | IN | TMPOFF | 9904 | HEAD 1 AUTO-RECALIBRATION SLOPE CORRECTION |
| VARIABLE | IMASK1 | 0000 | IN | MSKCOM | 9906 | HEAD 1 RIGHT MASK REFERENCE VALUE |
| VARIABLE | IWINDX | 0002 | IN | MSKCOM | 9908 | WINDOW FOR NO X DEFLECT & RIGHT DEFLECT FOR HEAD 1 |
| VARIABLE | IGAGDM | 0003 | IN | MSKCOM | 9909 | SPARE - NO FUNCTION |
| ARRAY | ILFMSK | 0000 | IN | LEFTCL | 990A | LEFT MASK REFERENCE VALUES FOR HEAD 1 |
| ARRAY | IWINDO | 000A | IN | LEFTCL | 9914 | WINDOWS FOR EACH LEFT MASK ON HEAD 1 |
| VARIABLE | NSAMPL | 0006 | IN | MASGAG | 9E62 | THE NUMBER OF SAMPLES TO BE AVERAGED PER READING |
| ARRAY | IBDGT2 | 0065 | IN | MASGAG | 9EC1 | HISTOGRAM TABLE FOR HEAD 1 |
| VARIABLE | IDVLIM | 0161 | IN | MASGAG | 9FBD | MAXIMUM ALLOWABLE DEVIATION |
| VARIABLE | ICLFLG | 0162 | IN | MASGAG | 9FBE | CALIBRATION FLAG (PREVENTS CALLS TO CMPNST) |
| VARIABLE | IDEV1 | 0163 | IN | MASGAG | 9FBF | DEVIATION OF HEAD 1 FOR A SINGLE READING |
| VARIABLE | IPOS1 | 0165 | IN | MASGAG | 9FC1 | BAR POSITION OF HEAD 1 FOR A SINGLE READING |
| VARIABLE | NGOOD1 | 0167 | IN | MASGAG | 9FC3 | FOR HEAD 1 - # OF GOOD SAMPLES AVERAGED IN A READING |
| VARIABLE | IERR | 0000 | IN | GAGERR | 57FB | GAGE ERROR CODE |
| VARIABLE | IRECAL | 0001 | IN | GAGERR | 57FC | RECALIBRATION FLAG (FALSE = NO RECALIBRATION DONE) |
| VARIABLE | IHMD2 | 0001 | IN | BDCCOM | 5701 | HOT METAL DETECTOR - FINISHING STAND |
| VARIABLE | ICDAIM | 0028 | IN | BDCCOM | 5728 | COLD AIM SIZE |
| VARIABLE | IGRADE | 0029 | IN | BDCCOM | 5729 | % CARBON |
| VARIABLE | IHAIM1 | 002A | IN | BDCCOM | 572A | HOT AIM SIZE FOR HEAD 1 |
| VARIABLE | ISEC | 0000 | IN | MONCOM | 5400 | CURRENT SECONDS |
| VARIABLE | IMIN | 0001 | IN | MONCOM | 5401 | CURRENT MINUTES |
| VARIABLE | IHOUR | 0002 | IN | MONCOM | 5402 | CURRENT HOUR |
| VARIABLE | IMONTH | 0005 | IN | MONCOM | 5405 | CURRENT MONTH |
| VARIABLE | IDATE | 0006 | IN | MONCOM | 5406 | CURRENT DATE |
| VARIABLE | IYEAR | 0007 | IN | MONCOM | 5407 | CURRENT YEAR |
| VARIABLE | ITMP22 | 0001 | IN | SYSCOM | 5450 | BAR TEMPERATURE AT FINISHING STAND |
| ARRAY | ITRABF | 0000 | IN | TRKCOM | 5580 | TOLERANCE LIMITS FOR CURRENT BAR AT FINISHING STAND |

FIG. 6A

HEXADECIMAL CORE MAP

| TYPE | NAME | POSITION IN COMMON AREA | COMMON NAME | CORE LOCATION | DESCRIPTION |
|---|---|---|---|---|---|
| VARIABLE | ISEC | 0000 IN | MONCOM | 5400 | CURRENT SECONDS |
| VARIABLE | IMIN | 0001 IN | MONCOM | 5401 | CURRENT MINUTES |
| VARIABLE | IHOUR | 0002 IN | MONCOM | 5402 | CURRENT HOUR |
| VARIABLE | IMONTH | 0005 IN | MONCOM | 5405 | CURRENT MONTH |
| VARIABLE | IDATE | 0006 IN | MONCOM | 5406 | CURRENT DATE |
| VARIABLE | IYEAR | 0007 IN | MONCOM | 5407 | CURRENT YEAR |
| VARIABLE | ITMP22 | 0001 IN | SYSCOM | 5450 | BAR TEMPERATURE AT FINISHING STAND |
| ARRAY | ITRABF | 0000 IN | TRKCOM | 5580 | TOLERANCE LIMITS FOR CURRENT BAR AT FINISHING STAND |

FIG. 6B

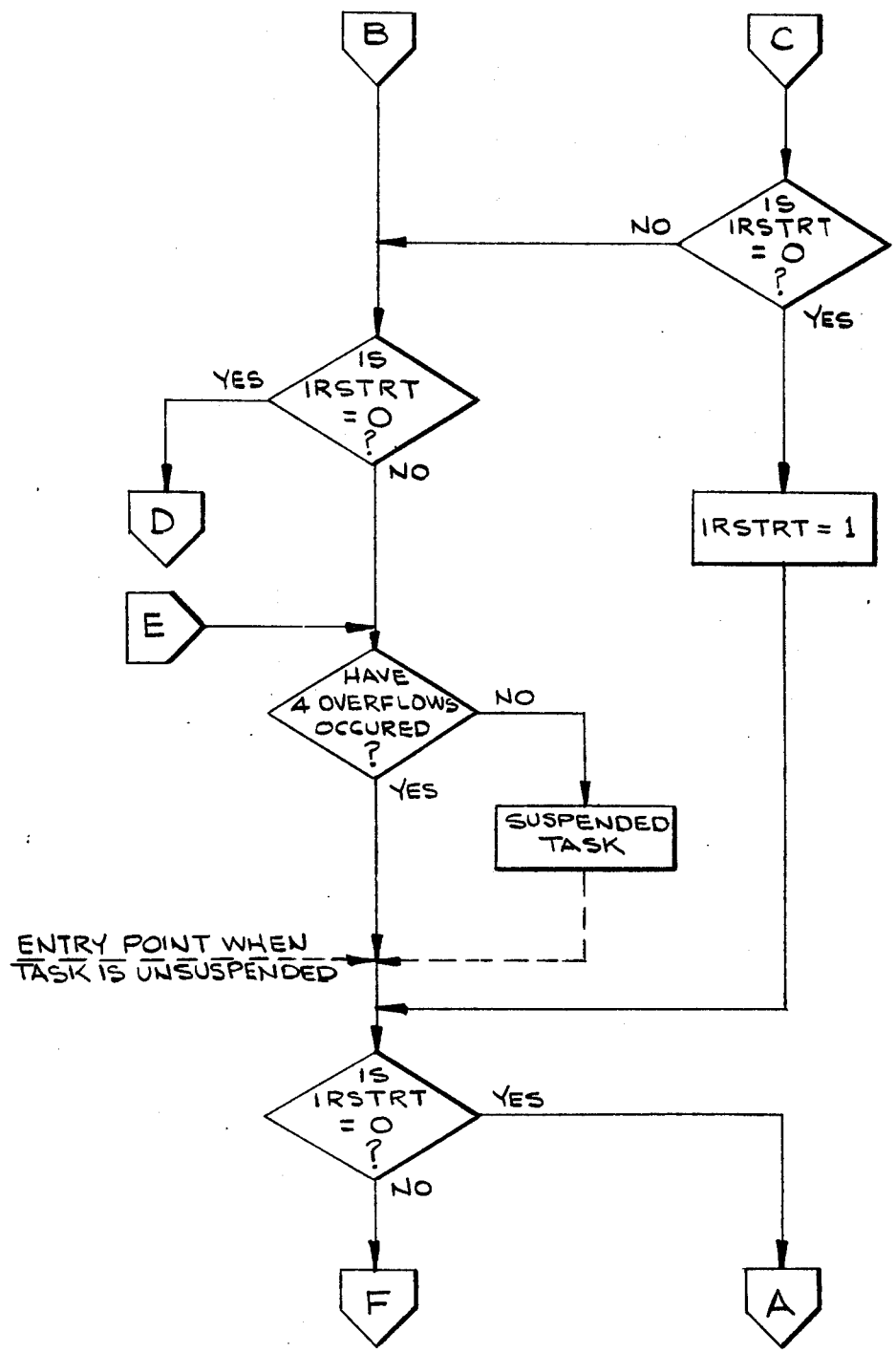
FIG.—7C

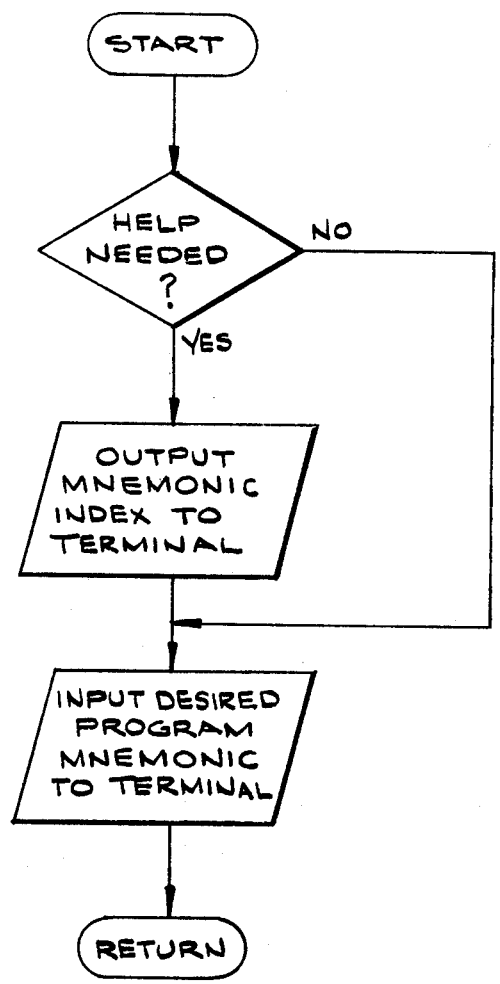
FIG.—11A

GAGE OFFLINE SYSTEM

MNEMONICS ARE AS FOLLOWS:

MP - BUILDS FIELD OF VIEW COMPENSATION MAPS
PR - ROTATES SCANNER 90 DEGREES AND BUILDS PROFILE TABLE
PL - PLOTS PROFILE TABLE
TY - PRINTS MAPS, SLOPE & OFFSET FACTORS, AND MASK VALUES
SC - ROTATES SCANNER TO DESIRED ANGLE
OF - ALLOWS ENTRY OF SLOPE AND OFFSET CORRECTION FACTORS
ZE - ZEROES ALL MAPS AND CORRECTION FACTORS !!!CAUTION!!!
TR - DISK TRANSFER OF GAGE COMMON TO CONTROL SYS. AREA
XT - EXITS TO MONITOR AND ATTEMPTS TO WRITE COMMON AREA
     CONTAINING MAPS, SLOPE AND OFFSET CORRECTION FACTORS,
     AND WINDOW VALUES TO THE DISK. THE DISK FILE WILL
     ONLY BE UPDATED IF DISK SWITCH 12 IS UP. THIS FILE
     IS READ FROM THE DISK WHEN THIS TASK (20) IS CALLED
     BY THE MONITOR.

FIG. 11B

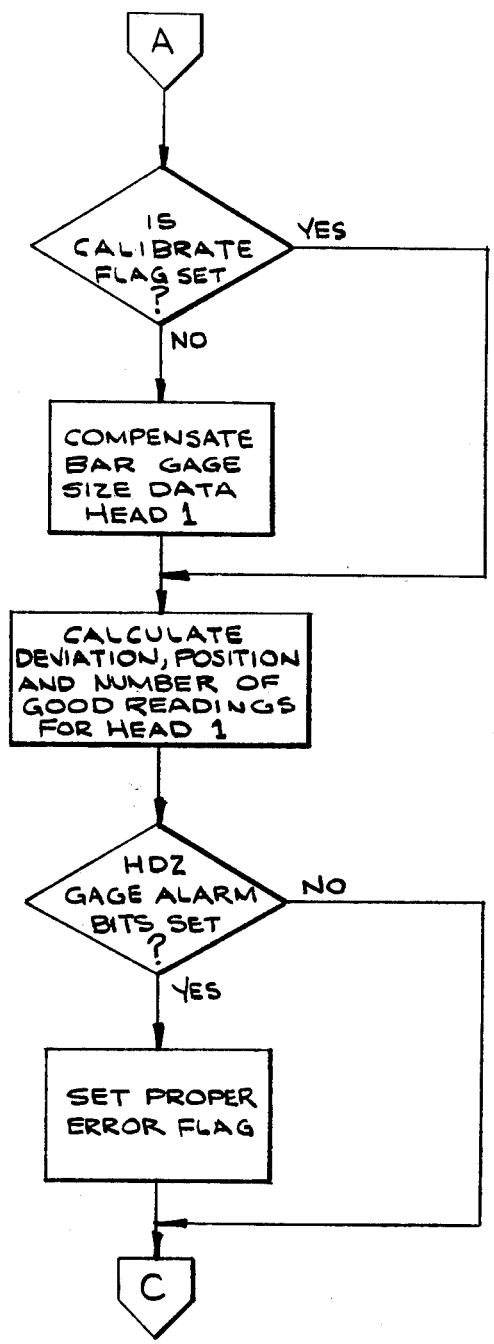
FIG.—13B

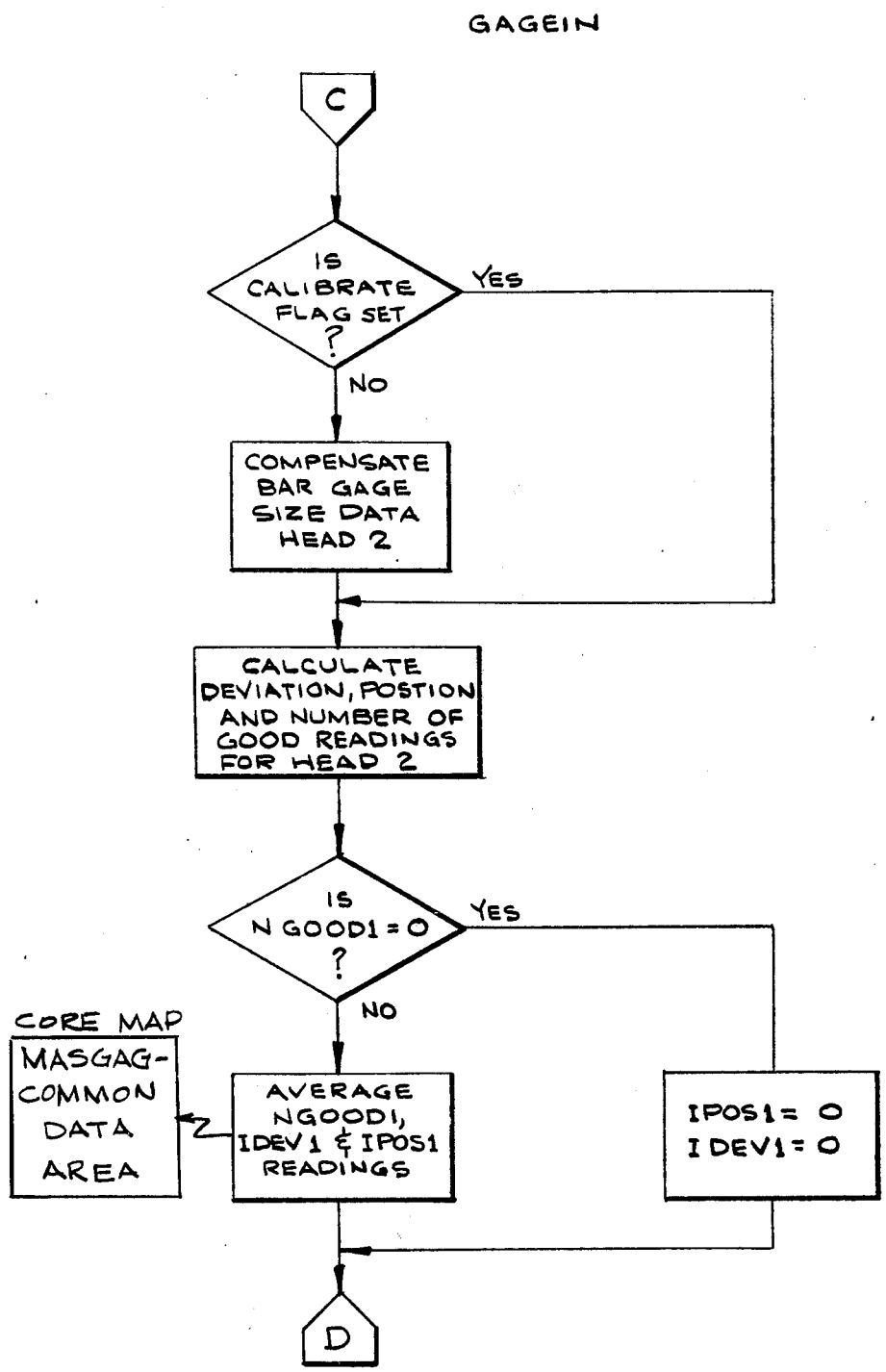
FIG.—13C

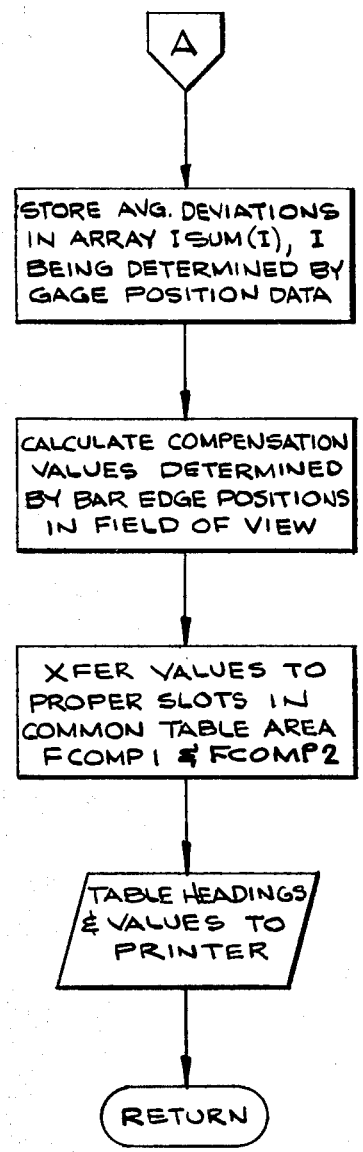
FIG.—14B

DATE        TIME
HEAD 1 FIELD OF VIEW COMPENSATION MAP

|  | -1.6 | -1.2 | -0.8 | -0.4 | 0.0 | +0.4 | +0.8 | +1.2 | +1.6 |
|---|---|---|---|---|---|---|---|---|---|
| 0.000 | 99.0 | -1.0 | -1.0 | -0.2 | 0.0 | 0.4 | 2.8 | 10.2 | 108.0 |
| 0.016 | 98.8 | -0.8 | -1.0 | -0.2 | 0.0 | 0.6 | 3.0 | 10.6 | 108.4 |
| 0.032 | 99.0 | -0.8 | -1.0 | 0.0 | 0.0 | 0.4 | 3.2 | 11.0 | 108.8 |
| 0.048 | 3.0 | -1.0 | -1.0 | 0.0 | 0.0 | 0.6 | 3.2 | 11.6 | 109.2 |
| 0.064 | 3.0 | -1.0 | -1.0 | 0.0 | 0.0 | 0.6 | 3.6 | 12.0 | 109.6 |
| 0.080 | 2.6 | -1.0 | -1.0 | 0.0 | 0.0 | 0.6 | 3.8 | 12.8 | 110.2 |
| 0.096 | 2.4 | -1.2 | -0.8 | 0.0 | 0.0 | 0.8 | 4.2 | 13.4 | 110.6 |
| 0.112 | 2.0 | -1.0 | -0.8 | 0.0 | 0.0 | 0.8 | 4.2 | 14.2 | 111.0 |
| 0.128 | 1.8 | -1.4 | -0.8 | 0.0 | 0.0 | 0.8 | 4.4 | 14.6 | 111.6 |
| 0.144 | 1.4 | -1.2 | -0.8 | 0.0 | 0.0 | 1.0 | 4.8 | 15.6 | 112.0 |
| 0.160 | 1.2 | -1.2 | -0.8 | 0.0 | 0.0 | 1.0 | 4.8 | 16.4 | 112.8 |
| 0.176 | 1.0 | -1.0 | -0.8 | 0.0 | 0.0 | 1.2 | 5.2 | 17.2 | 113.4 |
| 0.192 | 0.6 | -1.2 | -0.6 | 0.0 | 0.0 | 1.2 | 5.4 | 17.8 | 114.2 |
| 0.208 | 0.4 | -1.2 | -0.8 | 0.0 | 0.0 | 1.2 | 5.6 | 18.8 | 114.6 |
| 0.224 | 0.2 | -1.2 | -0.6 | 0.0 | 0.0 | 1.4 | 6.0 | 19.6 | 115.6 |
| 0.240 | 0.0 | -1.2 | -0.6 | 0.0 | 0.0 | 1.4 | 6.2 | 20.4 | 116.4 |
| 0.256 | -0.2 | -1.2 | -0.4 | 0.0 | 0.0 | 1.6 | 6.8 | 21.2 | 117.2 |
| 0.272 | -0.2 | -1.2 | -0.4 | 0.0 | 0.0 | 1.6 | 7.0 | 105.4 | 117.8 |
| 0.288 | -0.2 | -1.2 | -0.4 | 0.0 | 0.0 | 1.8 | 7.2 | 105.6 | 118.8 |
| 0.304 | -0.4 | -1.2 | -0.4 | 0.0 | 0.0 | 1.8 | 7.8 | 106.0 | 119.6 |
| 0.320 | -0.6 | -1.2 | -0.4 | 0.0 | 0.2 | 2.0 | 8.0 | 106.2 | 120.6 |
| 0.336 | -0.8 | -1.2 | -0.4 | 0.0 | 0.2 | 2.2 | 8.4 | 106.8 | 121.2 |
| 0.352 | -0.8 | -1.0 | -0.2 | 0.0 | 0.2 | 2.2 | 8.8 | 107.0 | 205.4 |
| 0.368 | -1.0 | -1.0 | -0.2 | 0.0 | 0.2 | 2.4 | 9.2 | 107.2 | 205.6 |
| 0.384 | -1.0 | -1.0 | -0.2 | 0.0 | 0.4 | 2.4 | 9.6 | 107.8 | 206.0 |

HEAD 2 FIELD OF VIEW COMPENSATION MAP

|  | -1.6 | -1.2 | -0.8 | -0.4 | 0.0 | +0.4 | +0.8 | +1.2 | +1.6 |
|---|---|---|---|---|---|---|---|---|---|
| 0.000 | 10.2 | 2.6 | 0.2 | 0.0 | 0.0 | 0.6 | 3.2 | 10.4 | 108.4 |
| 0.016 | 9.6 | 2.4 | 0.0 | 0.0 | 0.0 | 0.6 | 3.4 | 11.0 | 108.8 |
| 0.032 | 9.2 | 2.2 | 0.0 | 0.0 | 0.0 | 0.6 | 3.6 | 11.4 | 109.2 |
| 0.048 | 8.8 | 2.0 | 0.0 | 0.0 | 0.0 | 0.6 | 3.8 | 12.0 | 109.6 |
| 0.064 | 8.4 | 2.0 | 0.0 | 0.0 | 0.0 | 0.8 | 4.0 | 12.4 | 110.0 |
| 0.080 | 8.0 | 1.8 | 0.0 | 0.0 | 0.0 | 0.8 | 4.4 | 13.0 | 110.4 |
| 0.096 | 7.4 | 1.6 | 0.0 | 0.0 | 0.0 | 1.0 | 4.6 | 13.6 | 111.0 |
| 0.112 | 7.2 | 1.6 | 0.0 | 0.0 | 0.0 | 1.0 | 4.6 | 14.0 | 111.4 |
| 0.128 | 6.6 | 1.4 | 0.0 | 0.0 | 0.0 | 1.0 | 4.8 | 14.6 | 112.0 |
| 0.144 | 6.4 | 1.4 | 0.0 | 0.0 | 0.0 | 1.2 | 5.2 | 15.2 | 112.4 |
| 0.160 | 6.2 | 1.2 | 0.0 | 0.0 | 0.0 | 1.2 | 5.4 | 16.0 | 113.0 |
| 0.176 | 5.8 | 1.0 | 0.0 | 0.0 | 0.0 | 1.4 | 5.8 | 16.6 | 113.6 |
| 0.192 | 5.4 | 1.0 | 0.0 | 0.0 | 0.0 | 1.4 | 6.0 | 17.0 | 114.0 |
| 0.208 | 5.2 | 0.8 | 0.0 | 0.0 | 0.0 | 1.4 | 6.2 | 17.4 | 114.6 |
| 0.224 | 4.8 | 0.8 | 0.0 | 0.0 | 0.0 | 1.6 | 6.6 | 105.2 | 115.2 |
| 0.240 | 4.8 | 0.8 | 0.0 | 0.0 | 0.0 | 1.6 | 6.8 | 105.4 | 116.0 |
| 0.256 | 4.2 | 0.6 | 0.0 | 0.0 | 0.2 | 1.8 | 7.2 | 105.8 | 116.6 |
| 0.272 | 4.0 | 0.6 | 0.0 | 0.0 | 0.2 | 1.8 | 7.4 | 106.0 | 117.0 |
| 0.288 | 3.8 | 0.6 | 0.0 | 0.0 | 0.2 | 2.0 | 7.8 | 106.2 | 117.4 |
| 0.304 | 3.8 | 0.4 | 0.0 | 0.0 | 0.2 | 2.0 | 8.2 | 106.6 | 205.2 |
| 0.320 | 3.4 | 0.4 | 0.0 | 0.0 | 0.2 | 2.2 | 8.4 | 106.8 | 205.4 |
| 0.336 | 3.2 | 0.2 | 0.0 | 0.0 | 0.4 | 2.6 | 8.8 | 107.2 | 205.8 |
| 0.352 | 3.0 | 0.2 | 0.0 | 0.0 | 0.4 | 2.6 | 9.2 | 107.4 | 206.0 |
| 0.368 | 2.8 | 0.2 | 0.0 | 0.0 | 0.4 | 2.8 | 9.6 | 107.8 | 206.2 |
| 0.384 | 2.6 | 0.2 | 0.0 | 0.0 | 0.4 | 3.0 | 10.0 | 108.2 | 206.6 |

FIG. 14C

GAGE CALIBRATION DATA

DATE        TIME

HEAD 1 FIELD OF VIEW COMPENSATION MAP

|       | -1.6  | -1.2 | -0.8 | -0.4 | 0.0 | +0.4 | +0.8 | +1.2  | +1.6  |
|-------|-------|------|------|------|-----|------|------|-------|-------|
| 0.000 | 99.0  | -1.0 | -1.0 | -0.2 | 0.0 | 0.4  | 2.8  | 10.2  | 108.0 |
| 0.016 | 98.8  | -0.8 | -1.0 | -0.2 | 0.0 | 0.6  | 3.0  | 10.6  | 108.4 |
| 0.032 | 99.0  | -0.8 | -1.0 | 0.0  | 0.0 | 0.4  | 3.2  | 11.0  | 108.8 |
| 0.048 | 3.0   | -1.0 | -1.0 | 0.0  | 0.0 | 0.6  | 3.2  | 11.6  | 109.2 |
| 0.064 | 3.0   | -1.0 | -1.0 | 0.0  | 0.0 | 0.6  | 3.6  | 12.0  | 109.6 |
| 0.080 | 2.6   | -1.0 | -1.0 | 0.0  | 0.0 | 0.6  | 3.8  | 12.8  | 110.2 |
| 0.096 | 2.4   | -1.2 | -0.8 | 0.0  | 0.0 | 0.8  | 4.2  | 13.4  | 110.6 |
| 0.112 | 2.0   | -1.0 | -0.8 | 0.0  | 0.0 | 0.8  | 4.2  | 14.2  | 111.0 |
| 0.128 | 1.8   | -1.4 | -0.8 | 0.0  | 0.0 | 0.8  | 4.4  | 14.6  | 111.6 |
| 0.144 | 1.4   | -1.2 | -0.8 | 0.0  | 0.0 | 1.0  | 4.8  | 15.6  | 112.0 |
| 0.160 | 1.2   | -1.2 | -0.8 | 0.0  | 0.0 | 1.0  | 4.8  | 16.4  | 112.8 |
| 0.176 | 1.0   | -1.0 | -0.8 | 0.0  | 0.0 | 1.2  | 5.2  | 17.2  | 113.4 |
| 0.192 | 0.6   | -1.2 | -0.6 | 0.0  | 0.0 | 1.2  | 5.4  | 17.8  | 114.2 |
| 0.208 | 0.4   | -1.2 | -0.8 | 0.0  | 0.0 | 1.2  | 5.6  | 18.8  | 114.6 |
| 0.224 | 0.2   | -1.2 | -0.6 | 0.0  | 0.0 | 1.4  | 6.0  | 19.6  | 115.6 |
| 0.240 | 0.0   | -1.2 | -0.6 | 0.0  | 0.0 | 1.4  | 6.2  | 20.4  | 116.4 |
| 0.256 | -0.2  | -1.2 | -0.4 | 0.0  | 0.0 | 1.6  | 6.8  | 21.2  | 117.2 |
| 0.272 | -0.2  | -1.2 | -0.4 | 0.0  | 0.0 | 1.6  | 7.0  | 105.4 | 117.8 |
| 0.288 | -0.2  | -1.2 | -0.4 | 0.0  | 0.0 | 1.8  | 7.2  | 105.6 | 118.8 |
| 0.304 | -0.4  | -1.2 | -0.4 | 0.0  | 0.0 | 1.8  | 7.8  | 106.0 | 119.6 |
| 0.320 | -0.6  | -1.2 | -0.4 | 0.0  | 0.2 | 2.0  | 8.0  | 106.2 | 120.6 |
| 0.336 | -0.8  | -1.2 | -0.4 | 0.0  | 0.2 | 2.2  | 8.4  | 106.8 | 121.2 |
| 0.352 | -0.8  | -1.0 | -0.2 | 0.0  | 0.2 | 2.2  | 8.8  | 107.0 | 205.4 |
| 0.368 | -1.0  | -1.0 | -0.2 | 0.0  | 0.2 | 2.4  | 9.2  | 107.2 | 205.6 |
| 0.384 | -1.0  | -1.0 | -0.2 | 0.0  | 0.4 | 2.4  | 9.6  | 107.8 | 206.0 |

HEAD 2 FIELD OF VIEW COMPENSATION MAP

|       | -1.6 | -1.2 | -0.8 | -0.4 | 0.0 | +0.4 | +0.8 | +1.2  | +1.6  |
|-------|------|------|------|------|-----|------|------|-------|-------|
| 0.000 | 10.2 | 2.6  | 0.2  | 0.0  | 0.0 | 0.6  | 3.2  | 10.4  | 108.4 |
| 0.016 | 9.6  | 2.4  | 0.0  | 0.0  | 0.0 | 0.6  | 3.4  | 11.0  | 108.8 |
| 0.032 | 9.2  | 2.2  | 0.0  | 0.0  | 0.0 | 0.6  | 3.6  | 11.4  | 109.2 |
| 0.048 | 8.8  | 2.0  | 0.0  | 0.0  | 0.0 | 0.6  | 3.8  | 12.0  | 109.6 |
| 0.064 | 8.4  | 2.0  | 0.0  | 0.0  | 0.0 | 0.8  | 4.0  | 12.4  | 110.0 |
| 0.080 | 8.0  | 1.8  | 0.0  | 0.0  | 0.0 | 0.8  | 4.4  | 13.0  | 110.4 |
| 0.096 | 7.4  | 1.6  | 0.0  | 0.0  | 0.0 | 1.0  | 4.6  | 13.6  | 111.0 |
| 0.112 | 7.2  | 1.6  | 0.0  | 0.0  | 0.0 | 1.0  | 4.6  | 14.0  | 111.4 |
| 0.128 | 6.6  | 1.4  | 0.0  | 0.0  | 0.0 | 1.0  | 4.8  | 14.6  | 112.0 |
| 0.144 | 6.4  | 1.4  | 0.0  | 0.0  | 0.0 | 1.2  | 5.2  | 15.2  | 112.4 |
| 0.160 | 6.2  | 1.2  | 0.0  | 0.0  | 0.0 | 1.2  | 5.4  | 16.0  | 113.0 |
| 0.176 | 5.8  | 1.0  | 0.0  | 0.0  | 0.0 | 1.4  | 5.8  | 16.6  | 113.6 |
| 0.192 | 5.4  | 1.0  | 0.0  | 0.0  | 0.0 | 1.4  | 6.0  | 17.0  | 114.0 |
| 0.208 | 5.2  | 0.8  | 0.0  | 0.0  | 0.0 | 1.4  | 6.2  | 17.4  | 114.6 |
| 0.224 | 4.8  | 0.8  | 0.0  | 0.0  | 0.0 | 1.6  | 6.6  | 105.2 | 115.2 |
| 0.240 | 4.8  | 0.8  | 0.0  | 0.0  | 0.0 | 1.6  | 6.8  | 105.4 | 116.0 |
| 0.256 | 4.2  | 0.6  | 0.0  | 0.0  | 0.2 | 1.8  | 7.2  | 105.8 | 116.6 |
| 0.272 | 4.0  | 0.6  | 0.0  | 0.0  | 0.2 | 1.8  | 7.4  | 106.0 | 117.0 |
| 0.288 | 3.8  | 0.6  | 0.0  | 0.0  | 0.2 | 2.0  | 7.8  | 106.2 | 117.4 |
| 0.304 | 3.8  | 0.4  | 0.0  | 0.0  | 0.2 | 2.0  | 8.2  | 106.6 | 205.2 |
| 0.320 | 3.4  | 0.4  | 0.0  | 0.0  | 0.2 | 2.2  | 8.4  | 106.8 | 205.4 |
| 0.336 | 3.2  | 0.2  | 0.0  | 0.0  | 0.4 | 2.6  | 8.8  | 107.2 | 205.8 |
| 0.352 | 3.0  | 0.2  | 0.0  | 0.0  | 0.4 | 2.6  | 9.2  | 107.4 | 206.0 |
| 0.368 | 2.8  | 0.2  | 0.0  | 0.0  | 0.4 | 2.8  | 9.6  | 107.8 | 206.2 |
| 0.384 | 2.6  | 0.2  | 0.0  | 0.0  | 0.4 | 3.0  | 10.0 | 108.2 | 206.6 |

FIG. 17B

GAGE CALIBRATION DATA

DATE            TIME

HEAD 1 OFFSET CORRECTION =   16

HEAD 1 SLOPE CORRECTION  =   13

HEAD 2 OFFSET CORRECTION =   16

HEAD 2 SLOPE CORRECTION  =   14

*Fig. 17C*

DATE　　　　　　TIME

AIMSIZE = 0.5096

```
0   0   0   0   0   0   0   0   0   0
0   0   0   0   0   0   0   0   0   0
0   0   0   0   2   0   2   2   4   2
2   4   4   4   2   4   4   6   6   8
8   8   8   6   8   8   2   0   0   2
2   0   2   2   2   0   2   0   0   0
2   0   2   0   2   0   0   0   0   2
0   2   2   0   2   0   2   0   2   0
0   0   2   0   0   0   0   0   0   0
0   0   0   0
```

HEAD1 AIMSIZE = 0.5094    HEAD2 AIMSIZE = 0.5094

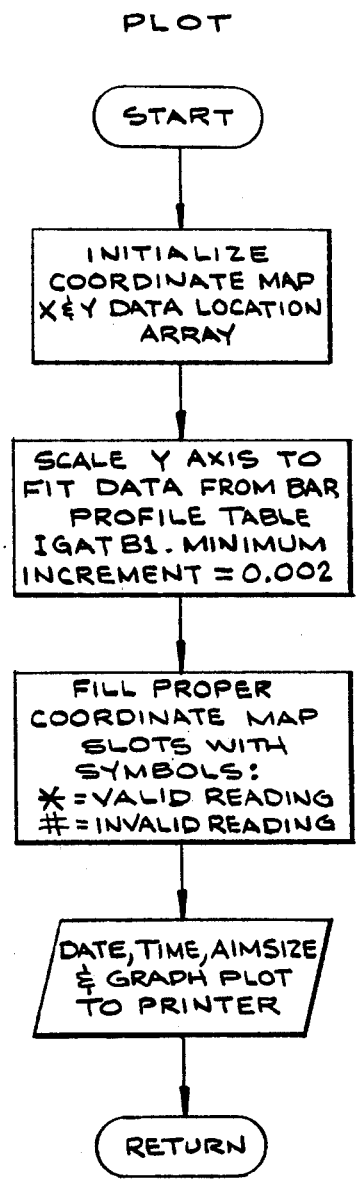
FIG.—23A

BAR GAUGE PLOTTING AND DISPLAY SYSTEM

CROSS-REFERENCES TO RELATED APPLICATIONS

The following co-pending applications owned by the same assignee are incorporated as follows:

| Cross-Reference | Title |
| --- | --- |
| (A) | "Electro-Optical Gaging System Having Dual Cameras Mounted on a Scanner", by T.L. Galanis, et al filed concurrently herewith. |
| (B) | "Scanning Pyrometer System", by J.J. Roche et al Serial No. 522,363, filed 11-8-74. |

BACKGROUND OF THE INVENTION

1. Field of the Invention

This invention relates broadly to electro-optical gaging methods and systems. More particularly, this invention relates to an electro-optical method and system for gaging plural dimensions of an object at various peripheral positions and plotting and displaying the profile of the object. The invention may be used to determine two lateral dimensions and lateral profile of a moving hot bar during bar rolling in a steel mill as is disclosed herein. Similarly, the invention may be used to gage the dimensions and profile of other shaped objects and in other environments as well.

2. Description of the Prior Art

Generally, in steel mills where hot round bars are rolled, productivity demands require that a variety of bars be rolled at speeds of up to 4000 ft./min. (1219 m.) and sizes of up to three inches in diameter (7.62 cm.) while the bar rolling temperature is about 1700° F. (930° C.). Further demands require that the specifications on finished cold bar size and out-of-roundness be within one-half existing commercial tolerances. In order to meet these requirements, a computer-controlled rolling process must be implemented that will combine order data with operating measurements to produce mill control signals that will maximize productivity while minimizing, or desirably eliminating, off-specification product.

Some of the operating data used in mill control computer calculations and referred to herein are: desired bar diameter, or aim size; aim size full- and half-commercial tolerances; and bar grade, or percent carbon composition of the bar to be rolled. Some of the operating measurements mentioned above and of particular importance are: actual bar diameter, or bar size; actual bar lateral profile, or bar profile. Another operating measurement is bar temperature, a parameter used to correct hot bar size to cold bar size in both bar measurement and computer control aspects of mill operation.

In order that the mill control computer may be programmed to meet the strict requirements of mill speed, bar size and size half-tolerances, it is desirous that all operating measurements have the following characteristics. Bar size and profile measurements be made when the bar vibrates in a lateral orbit while moving longitudinally during rolling; have an accuracy equivalent to one-quarter commercial tolerance; maintain a high degree of reliability; all measurements made under the severe environment normally present in a steel rolling mill. Bar temperature measurements should have similar characteristics.

Several types of electro-optical gaging systems are available to measure bar size. One early type of bar size gaging system operates on the self-illumination principle in which chopped infrared radiation from the hot bar is imaged through a lens onto an infrared detector. Elementary edge-detection circuitry was used in an attempt to define raw detector pulses in relation to bar edges.

Three more recent electro-optical systems applicable to bar size measurements operate on the principle of back-lighting a test object to be measured and imaging a shadow of the object through a lens onto the face of an electronic camera. In one such gaging system, a scanning laser beam illuminates the test object and the lens system focuses the object shadow onto a phototransistor. In a second such gaging system, a stationary light source of fixed intensity illuminates the test object and the lens system focuses the object shadow onto an electronically scanned image orthicon tube having two-axis unidirectional scanning. In the third such system, the image orthicon tube is replaced by a self-scanning photodiode array.

The photoresponsive device in each of the three back-lighted gaging systems generates a raw camera pulse having a width that approximates the object dimension between shadow edges. Raw camera pulses are processed in edge detection circuitry having either plain differentiators or gated differentiators which further attempt to more closely define camera pulse width in relation to the object dimension.

Two additional types of electro-optical gaging systems are available which combine the above features to measure bar lateral profile. One type of profile gaging system combines two self-illuminated cameras fixedly disposed orthogonally perpendicular to the bar mill pass line. This system in fact produces only two bar diameter measurements 90° apart but not bar profile measurements. The other type of electro-optical bar profile gaging system incorporates two back-lighted cameras mounted orthogonally on a scanner, whereby two bar diameter measurements and a scanner position measurement are indicated separately and/or recorded on a multichannel recorder during peripheral scanning of the bar.

Each of the foregoing prior art electro-optical bar size and bar profile gaging systems has met with varying degrees of success in certain types of installations. However, none of these gaging systems is entirely satisfactory to use as a bar dimension and profile gaging system in the environment of a contemporary high-speed hot steel bar rolling mill. Such gaging systems fail to meet the foregoing measurement requirements for one or more of the following reasons.

Difficulties with prior art gaging systems are first, the object to be measured must be confined to a given position in the camera field-of-view. Second, inability to meet system accuracy. Third, inability or insufficient capability to correct for such error sources as optical and electronic nonlinearities, all of which affect gaging system accuracy. Fourth, inability to provide a meaningful plot and display of cold bar diameters and profile information at various peripheral positions to either a rolling mill operator or a rolling mill control computer.

SUMMARY OF THE INVENTION

A main object of this invention is to provide an improved electro-optical gaging method and system.

One other object of this invention is to provide an improved electro-optical gaging method and system which is accurate and reliable in the environment of a contemporary high-speed hot steel bar rolling mill.

Another object of this invention is to provide an improved electro-optical gaging method and apparatus which permits accurate measurement of an object when placed at any position in a camera field-of-view, including while the object is vibrating in an orbit lateral to longitudinal movement of the object.

Another object of this invention is to provide an improved electro-optical gaging method and system which corrects camera object size signals for optical and electronic nonlinearities and/or other sources of error.

A further object of this invention is to provide an improved electro-optical gaging method and system which plots and displays and/or records two orthogonal dimensions of an object at one or more peripheral positions of the object.

Yet another object of this invention is to provide an improved electro-optical gaging method and system which plots the profile of an object and displays and/or records the plot overlaid on one or more commercial tolerance references of the object.

A final object of this invention is to provide an improved electro-optical gaging method and system which plots a profile of an object which is suitable for use by a computer controlled process.

The foregoing objects may advantageously be attained for use in a hot bar rolling mill, for example, by a computerized electro-optical system for gaging two-orthogonal dimensions of a moving and vibrating hot bar at various peripheral positions by using conventional dual back-lighted electronic camera heads mounted 90° apart on a scanner. Each camera head is provided with electronics where it is presumed the bar pulse has been corrected for optical and electronic systems. If each bar pulse is not correct, it is assumed that both a bar size pulse and a bar position-in-field-of-view pulse are generated by each camera electronics. Each camera's bar size and bar position signals, a scanner position signal, bar temperature and aim size and other signals are assimilated by a digital computer which is programmed to perform the following functions either off-line or on-line.

First, if uncorrected bar size signals are produced, the digital computer is programmed to correct each bar size signal by digitally compensating the field-of-view errors, other optical and electronic nonlinearities, bar temperature and other sources of errors, thereby providing highly accurate bar diameter measurements anywhere in the f.o.v. If bar size signals are already corrected this step may be eliminated. Second, calibrate the gage off-line. Third, automatically control scanner drive and incremental digital storage of corrected bar diameter measurements for each camera during scanning. Fourth, facilitate interaction with CRT and printing terminals to indicate and/or record: (a) each camera's bar diameter measurement anywhere in the scanning field; and (b) using stored bar diameter data and operating data header, plot bar profile deviation from aim gage where the plot is overlaid on full- or half-commercial tolerance references. The computer is adapted to communicate profile data to a rolling mill control system when requested by the control system.

BRIEF DESCRIPTION OF THE DRAWINGS

FIG. 1 is a block diagram of the overall computerized electro-optical gaging system having dual cameras on a scanner.

FIG. 2 is a diagram of a bar cross-section showing maximum and minimum tolerance limits in dotted circles, and includes a four-plane overlay related to bar profile orientation.

FIG. 3 is a computer printout of bar profile deviation vs. scanner angular position in relation to the four-plane overlay of FIG. 2, and includes an operating data header.

FIGS. 6A–B is a computer CORE MAP.

FIGS. 7A–E, 8, 9, 10A–B, 11A–B and 12 are flow charts of computer SERVICE PROGRAMS.

FIGS. 13A–D are flow charts of computer BAR GAGE DATA PROGRAM.

FIGS. 14A–C, 15, 16, 17A–C, 18 and 19 are flow charts of computer COMPENSATION PROGRAMS.

Figure 22D:
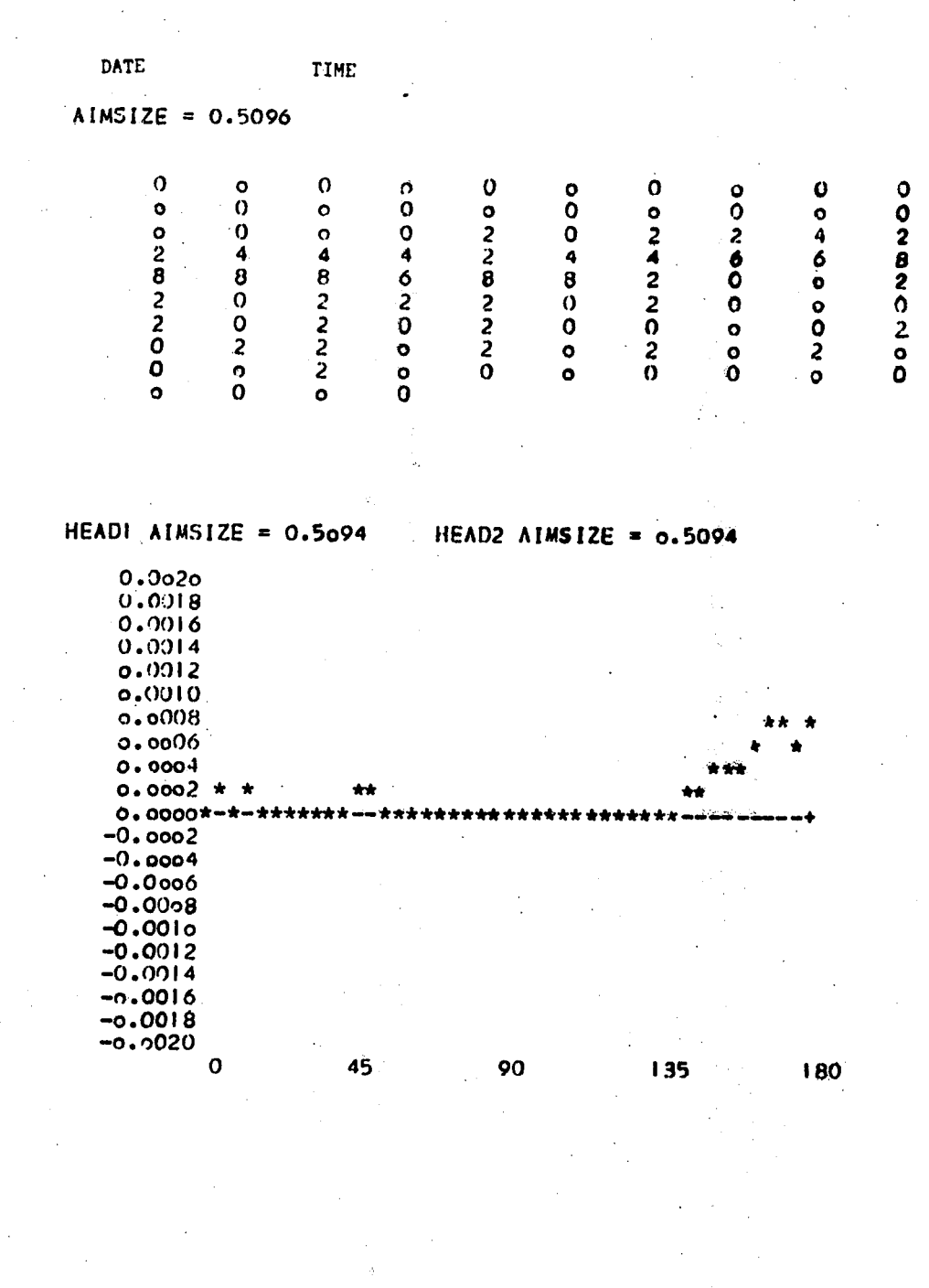

FIGS. 20, 21, 22A–D, 23A–B, 24A–B, 25, 26A–C are flow charts of computer PROFILE & POSITION PROGRAMS.

DESCRIPTION OF THE PREFERRED EMBODIMENT

Figure 4:
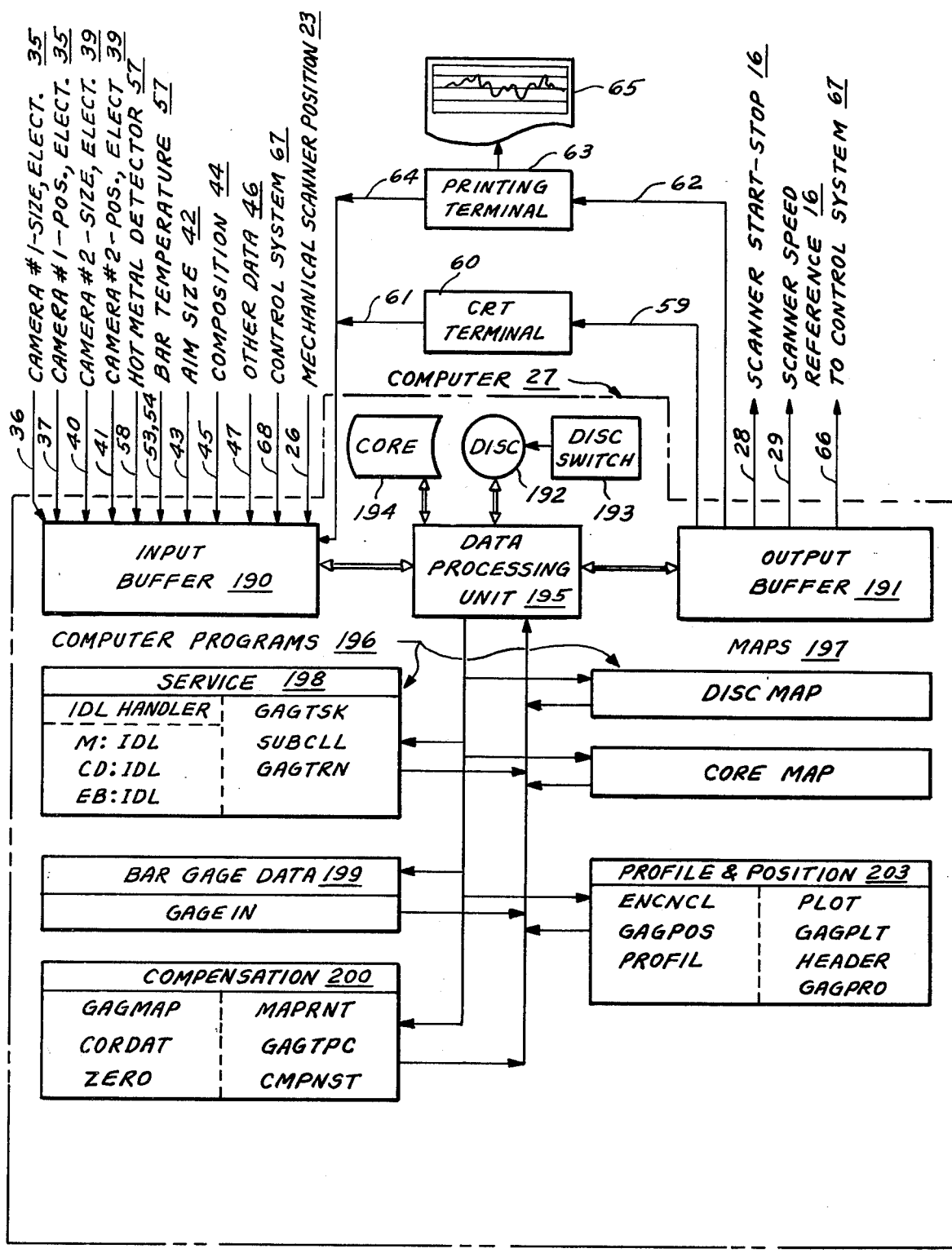
FIG. 4 is a block diagram of the computer shown in FIG. 1 and includes references to computer flow charts and printouts shown in FIGS. 5 to 26C.

Referring now to the drawings, particularly FIG. 1, there is shown a computerized electro-optical gaging system having dual back-lighted cameras mounted on a scanner in a hot steel bar rolling mill. The gaging system measures two orthogonal diameters of bar 10, for example, beyond the exit side of roll stand 11 while the scanner scans the peripheral surface of bar 10 for a prescribed angular displacement. As explained below, the two diameter signals and a scanner position signal are fed to a computer which plots the lateral profile of bar 10. Ultimately, the bar profile data is displayed, recorded and transmitted to a rolling mill control system which uses this data to control size and shape of bar 10 by (a) setting the lateral gap of the rolls in stand 11, (b) setting the vertical alignment of the rolls in stand 11, and (c) setting the lateral gap of the rolls in the rolling stand immediately preceding stand 11.

More specifically, dual head scanner 12 consists of reversible scanner mechanism 13 driven by motor 14 which is energized over wire 15 by variable speed controller 16. Two-mode selector switch 17 provides for either manual or automatic scanner operation as signalled over wire 18 to controller 16. This depends on whether a gaging system operator or the computer is to exercise optional manual or automatic scanner 12 control. Under manual control mode, manual speed, start-stop and scanner 12 direction control originates in control device 19 and these signals are fed over wire 20 to controller 16. Under automatic control mode, the manual control signal sources are disabled and scanner controller 16 receives corresponding signals from the computer as will be explained below.

Scanner position encoder 21 is coupled to mechanism 13 and generates an analog signal representing the absolute angular position of scanner 12. The encoder signal is fed over wire 22 to scanner position electronics 23 where they are converted to both analog and digital scanner position signals. The analog scanner position signals are fed over wire 24 to scanner position indicator 25 which may be observed by the gage operator when the scanning operation is under manual control mode. The digital scanner position signals are fed over wire 26 to computer 27 where they are assimilated with computer command signals under automatic control mode of scanner 12. Computer 27 then generates start-stop signals and speed control signals as described below. These signals are fed over respective wires 28 and 29 to scanner controller 16. During the automatic control mode, the digital scanner position signals are used in bar profile determining operations, also described below.

Mechanism 13 of dual head scanner 12 is adapted to mount first and second backlighted electronic camera heads, orthogonally to each other so as to be perpendicular to bar 10 during peripheral scanning of bar 10 through a prescribed angular displacement. Bar 10 profile plot scan is shown in FIGS. 1 and 2 as 90° rotation by scanner 12. This will gather enough camera signals to permit later plotting of 180° lateral profile of bar 10. A 180° profile plot is quite useful to a mill operator and a mill control computer as described below. Under other scanning requirements for bar size measurements, the scanning angular displacement may be other than 90°.

First light box 30 is located opposite first electronic camera head 31 so that when bar 10 intercepts light from box 30 a bar shadow having a width proportional to bar diameter at a first lateral position will be imaged on first electronic camera head 31. Similarly, second light box 32 is located opposite second electronic camera head 33 so that when bar 10 intercepts light from box 32 a bar shadow having a width proportional to bar diameter at a second lateral position, orthogonal to the first, will be imaged on second electronic camera head 33. The arrangement of first back-lighted camera head is typical of both camera heads.

Each light box 30, 32 is arranged to produce a light source perpendicular to bar 10 larger than the largest size bar 10 to be gaged in the camera field-of-view. For example, the camera field-of-view referred to below is three inches (7.62 cm.) and the light source used therewith is four inches (10.16 cm.). In addition, the wavelength and intensity of light boxes 30, 32 must be compatible with the sensitivity characterisitcs of electronic camera heads 31, 33.

The first shadow of bar 10, together with excess light beyond bar 10 edges directed from back light box 30, causes first electronic camera head 31 to generate a first camera signal. This signal consists of a raw camera pulse which is fed over wire 34 to conventional first camera electronics 35. It is presumed the first camera signal is processed to produce a bar size signal corrected for all optical and electronic system errors and then fed over wire 36 to computer 27. If such is not the case, it is then assumed that first camera electronics 35 will generate an uncorrected bar size signal and a bar position-in-field-of-view signal. In this case, both bar size and bar position signals are fed over respective wires 36, 37 to computer 27.

Simultaneously, the second shadow of bar 10, together with excess light beyond bar 10 edges directed by back light box 32, causes second electronic camera head 33 to generate a second camera signal. Similarly, this signal is a raw camera signal which is fed over wire 38 to second camber electronics 39. Here either a corrected bar size signal is generated or, as in the first camera case, uncorrected bar size and bar position signals are generated and fed over respective wires 40, 41 to computer 27.

An alternative to conventional back-lighted camera head and camera electronics arrangements is described in cross-reference (A). Here precision uncorrected bar size and bar position signals are generated which can be used for computer correction of bar size data.

Computer 27 in the present electro-optical bar gaging system also receives bar 10 aim size digital signals from thumbwheel selector 42 by way of cable 43. Aim size signals, exemplified as 1.7500 inches (4.445 cm.), are used to determine bar 10 profile deviation and other purposes described below. In addition, computer 27 also receives a bar 10 composition digital signal from thumbwheel selector 44 by way of cable 45. Composition signal, which is exemplified as 0.230% and represents percent carbon in the bar 10, is used as a factor in correcting hot bar 10 size to a cold size and other purposes described below. Further, computer 27 also receives appropriate order data signals, including date, time and size tolerance tables for bar 10, from source 46 by way of cable 47. Alternatively, any one or all of the aim size signals, composition signals, and other data signals may be supplied by a control system directly associated with rolling bar 10, depending upon the preference of the bar gaging system user.

In order to make temperature corrections to the diameter measurements of moving hot bar 10, a Land Co. optical pyrometer head 48 is provided adjacent scanner 12 and aimed at moving hot bar 10. Optical pyrometer head 48 is adapted to generate a high-response raw temperature signal which is fed over cable 49 to Land Co. pyrometer electronics 50. The raw temperature signal is corrected by scaling and linearizing circuits in pyrometer electronics 50 and the corrected temperature signal, exemplified as 1670° F. (910° C.), is fed over cable 51 to digital indicator 52. In addition, the corrected temperature signal is fed over cable 53 to to computer 27 where it is used to correct hot bar 10 diameter measurements to cold sizes.

Installation problems may preclude a Land Co. optical pyrometer head 48 and pyrometer electronics 50 from providing a corrected temperature signal to computer 27 and indicator 52 with desired accuracy and rate of response. If such is the case, an alternative to the Land Co. pyrometer arrangement may be to replace it with an optical field scanning pyrometer system disclosed in cross-reference (B). Briefly, the optical field scanning pyrometer system consists of a rapidly oscillating mirror mounted in a pyrometer head and aimed at a field-of-view through which hot bar 10 will travel. The hot bar is imaged through a slit and onto a high-response infrared detector in the pyrometer head. The infrared detector feeds a peak detector and sample-and-hold circuits to measure and store a nonlinear signal of bar 10 temperature. The stored nonlinear signal may be fed over cable 53 to computer 27 where it must be scaled and/or linearized. The stored temperature signal is updated every scan of the oscillating mirror, for example every 20 ms., by a busy-ready flag pulse fed over dotted-line cable 54. In addition, the stored temperature is scaled and linearized with less frequent up-dating and may be fed to bar temperature indicator 52. Provisions are made for adjusting field scanning frequency and width of field-of-view to suit a variety of installations.

The control system is initiated each time the leading end of hot bar 10 is detected leaving mill rolls 11. For this reason, hot metal detector 55 detects the presence and absence of hot bar 10 and feeds a corresponding signal over wire 56 to hot metal detector electronics 57. A presence/absence signal is fed over cable 58 to computer 27 where it initiates the automatic transfer of computer operations as mentioned above.

All of the scanner position signals, first and second camera signals, aim size signal, composition signal, other signals, temperature signal and hot metal presence/absence signal fed over respective cables 26, 36, 37, 40, 41, 43, 45, 47, 53 and 58 are assimilated by computer 27 to perform a variety of functions under control of a group of computer off-line and on-line programs detailed below. One of these functions is to generate the scanner start-stop signal on cable 28 and the scanner speed control signals on cable 29, both under automatic scanning mode control. Another function is to feed bar diameter data, bar profile deviation data overlaid on commercial tolerance references and operating header data from computer 27 over cable 59 to CRT terminal 60, and to accept interaction between a standard keyboard on terminal 60 and computer 27 by way of cable 61.

Another function of computer 27 is to feed bar diameter data, bar profile data overlaid on commercial tolerance references and operating header data from computer 27 over cable 62 to printing terminal 63, and to accept interactions between a standard keyboard on terminal 63 and computer 27 by way of cable 64. Printing terminal 63 produces printout 65 which is illustrated in FIG. 3. Still another function of computer 27 is to feed bar 10 profile data over cable 66 to control system 67 in response to corresponding request signals fed back to computer 27 by way of cable 68.

Turning now to FIG. 2, there is shown a cross-sectional diagram illustrating the lateral profile of bar 10. Dotted circular lines 69 and 70 are illustrative of maximum and minimum standard commercial tolerances for aim size diameter. Also illustrated by dotted straight lines are planes A—A, B—B, C—C and D—D which are of particular interest to a rolling mill operator and a control computer for determining the roll gap and alignment relationships of mill rolls 11 shown in FIG. 1. During non-scanning operations, it is preferred to bring scanner 12 to rest, at least temporarily, so that first camera head 31 and second camera head 33 will measure the diameters at planes C—C and A—A, respectively. The A plane dimension of bar 10 is illustrated at 71 as 1.7520 inches and the B plane dimension of bar 10 is illustrated at 72 as 1.7490 inches, the aim size being 1.7500 inches for illustrative purposes.

During bar scanning operations, second camera head 33 can start profile plot scan 73 at plane B—B, continue counter-clockwise 90° through plane C—C, and stop at plane D—D. At the same time, first camera head 31 will start scanning at plane D—D, continue counter-clockwise 90° through plane A—A and stop at plane B—B. In this manner, first and second camera heads 31, 33 scan a 180° lateral peripheral surface of bar 10 and this scan is plotted from plane B—B to C—C, D—D, A—A and ends back at B—B.

In the same manner, second camera head 33 can start profile plot 73 at plane D—D, continue clockwise 90° through plane C—C and stop at plane B—B. At the same time, first camera 31 is scanning clockwise from plane B—B through A—A and stopping at D—D. The direction of the scan is unimportant. The size and position data is correlated by absolute angular positions.

The resulting profile plot of bar 10 corrected to cold size is computer printout 65 shown in FIG. 3. Here bar profile 74 is overlaid on a specific size, size tolerance and bar position format generated by computer 27 shown in FIG. 1. The computer-generated format includes an operating data header; bar profile deviation from the actual cold aim size, selected by device 42 in FIG. 1, is the Y-axis variable; and the scanner 12 angular position is the X-axis variable. The Y-axis printout is graduated in 0.0010 inch increments above and below aim size dotted baseline 75 and extends beyond maximum and minimum full-commercial tolerance reference lines 76, 77. Reference lines 76, 77 are printed as dashed lines across the X-axis. In addition, maximum and minimum half-commercial tolerance reference lines 78, 79 are printed across the X-axis as alpha-numeric lines at fifteen angular degree increments of the 180° bar profile plot. At zero and each 45° increment, the FIG. 2 cross-section plane designations B, C, D, A and B are printed, while the intervening 15° and 30° increments are so printed relative to the A and C positions.

It should be noted that the display on CRT terminal 60 is substantially the same as computer printout 65, with one exception. That is, in addition to the bar profile deviation plot and computer-generated format, computer 27 also generates an additional display format of the FIG. 2 dotted-line scanning planes A—A, B—B, C—C and D—D as well as the actual numerical bar sizes A and C shown as items 71 and 72 in FIG. 2. Thus, CRT terminal 60 displays bar profile, bar diameter and bar scanning plane information in a form that is unique and quite useful to an operator of the bar gaging system as well as an operator of a rolling mill where the bar gage is used.

COMPUTER

A block diagram of the electro-optical bar gaging system computer 27 is illustrated in FIG. 4. Computer 27 is a digital system programmed to perform the various functions described below. A commercially available mini-computer may be used, or if desired, computer 27 may be shared in overall rolling mill control computer installation. Computer 27 is exemplified herein as a Westinghouse Electric Co. model W-2500 with an operating system for accommodating various levels of tasks as noted below:

Computer 27 is provided with conventional main components including input buffer 190, output buffer 191, disc storage 192, disc switches 193, core storage 194, all communicating by various channels with data processing unit 195. Computer 27 operations are controlled sequentially according to off-line and on-line computer programs 196. These comprise: computer maps 197, service programs 198, bar gage data program 199, compensation programs 200, and profile and position programs 203, all covered in FIGS. 5-27 described below.

All communications with the bar gaging system computer 27 from external sources are by way of input buffer 190 which includes means for converting input analog and digital signal to digital form. These include signals fed by wires or cables into the computer as follows: first camera electronics 35 on cables 36, 37; second camera electronics 39 on cables 40, 41; mechanical scanner position 23 on wire 26, hot metal detector 57 on wire 58; bar temperature 50 on cables 53, 54; bar aim size 42 on wire 43; bar composition 44 on wire 45; other data 46 on cable 47; control system 67 on cable 68; CRT terminal 60 on cable 61; and printing terminal 63 on cable 64.

All communications with bar gaging system computer 27 to external sources are by way of output buffer 191 which also includes means for converting output signals to digital form. These include signals fed by wires or cables from the computer as follows: scanner start-stop 16 on cable 28; scanner speed reference 16 on cable 29, and control system 67 on cable 66.

Individual wires in signal cables have been used through the drawings and these have been cabled according to their source and function as described above.

CRT terminal 60 includes a keyboard for operator interaction with computer 27.

Printing terminal 63 includes a keyboard for operator interaction with computer 27. Terminal 63 computer printout 65 includes a plot of bar profile deviation shown in FIG. 3, as well as tabular data in various figures listed below.

Generally, it is permissible for both terminals 60 and 63 to plot the same data. All interactions from either keyboard are by way of program mnemonics listed, for example, in FIG. 11B.

Disc switches 193 include switches designated "switch 10" and "switch 12" in the programs below. These switches must be turned on to "WRITE ENABLE" to write programs or data onto the disc.

COMPUTER PROGRAMS

The following table lists flow charts of individual and groups of programs associated with computer programs 196 used herein.

MAPS (197)

Figure 5:
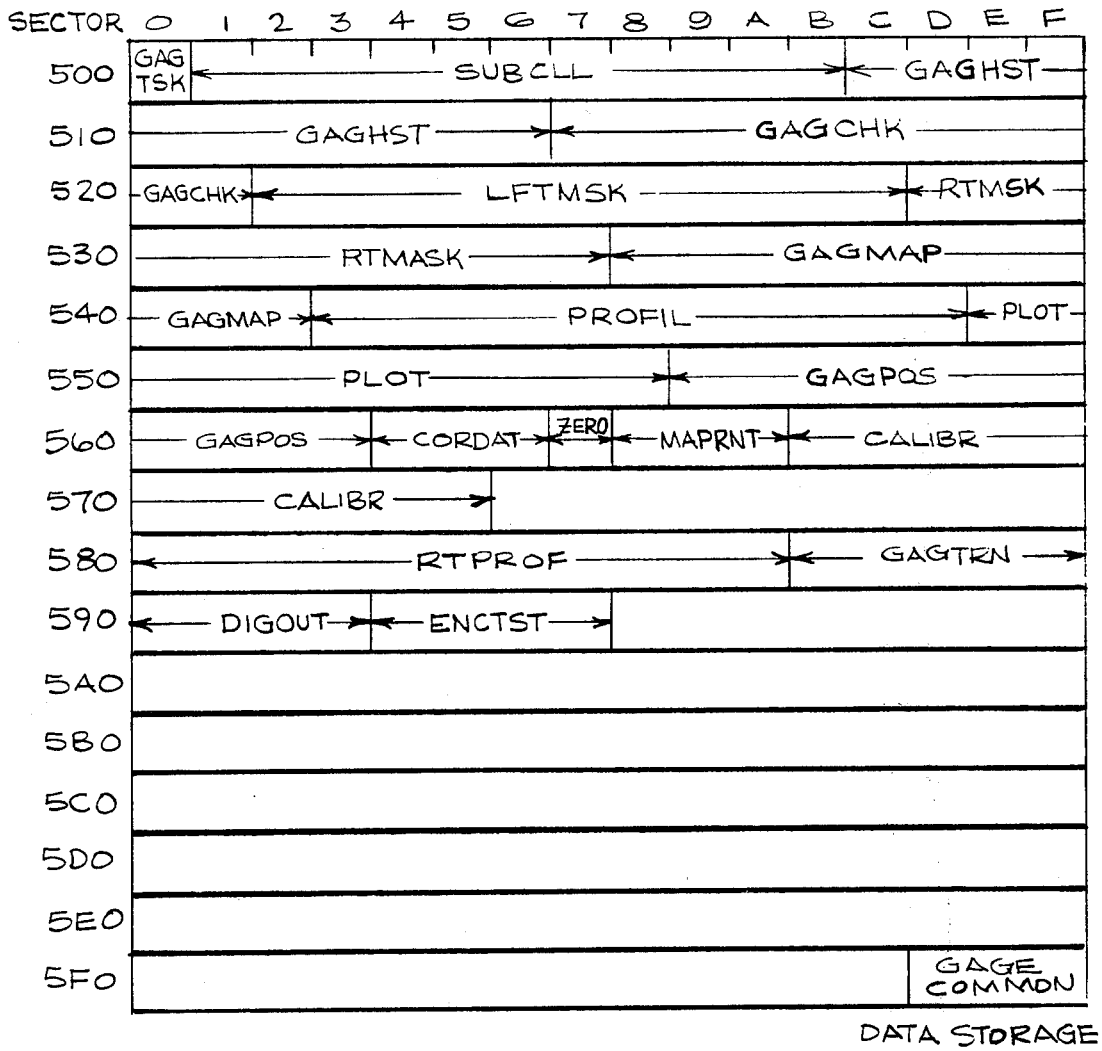
FIG. 5 is a computer DISC MAP.
Figure 7A:
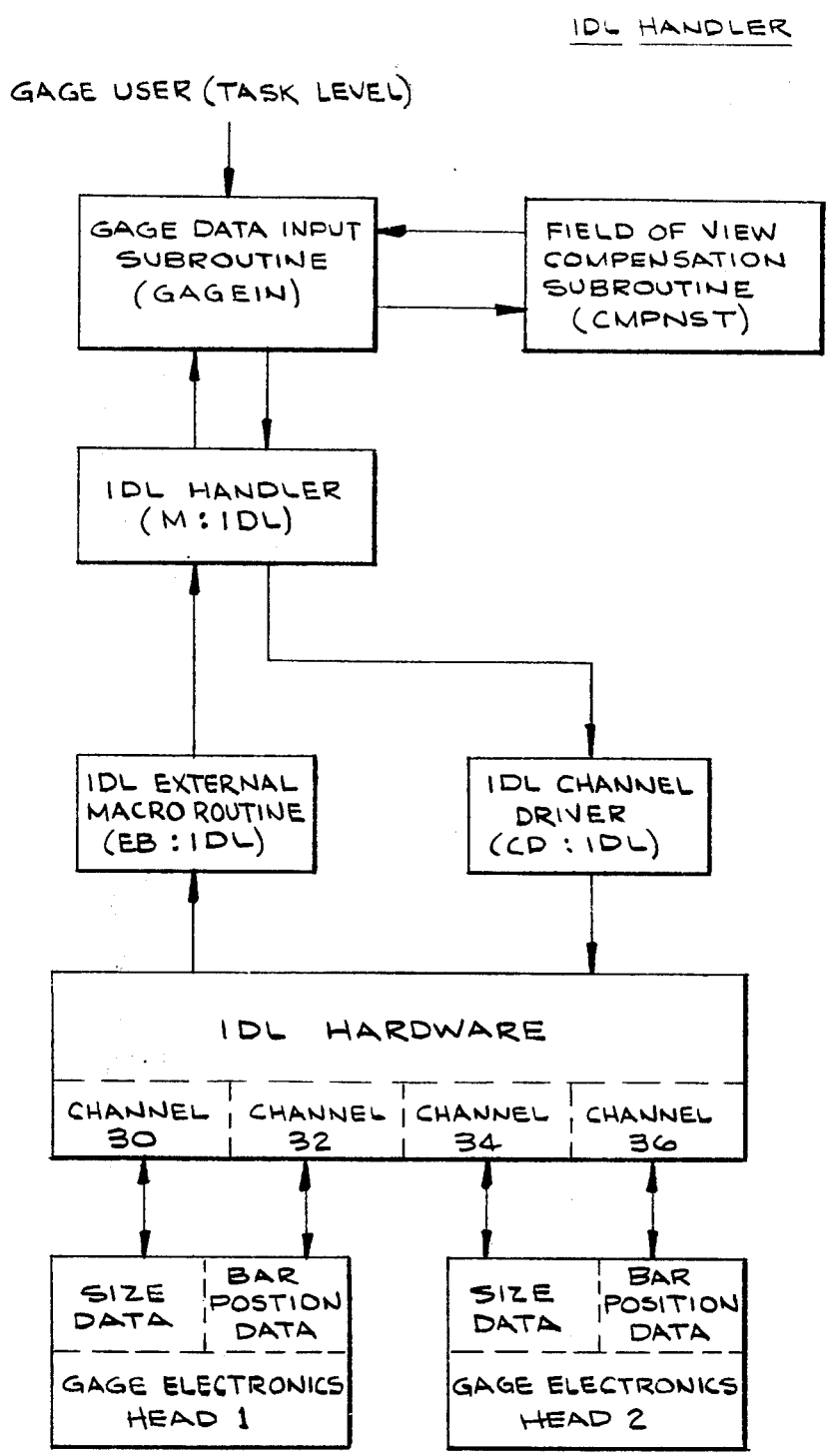
Figure 7B:
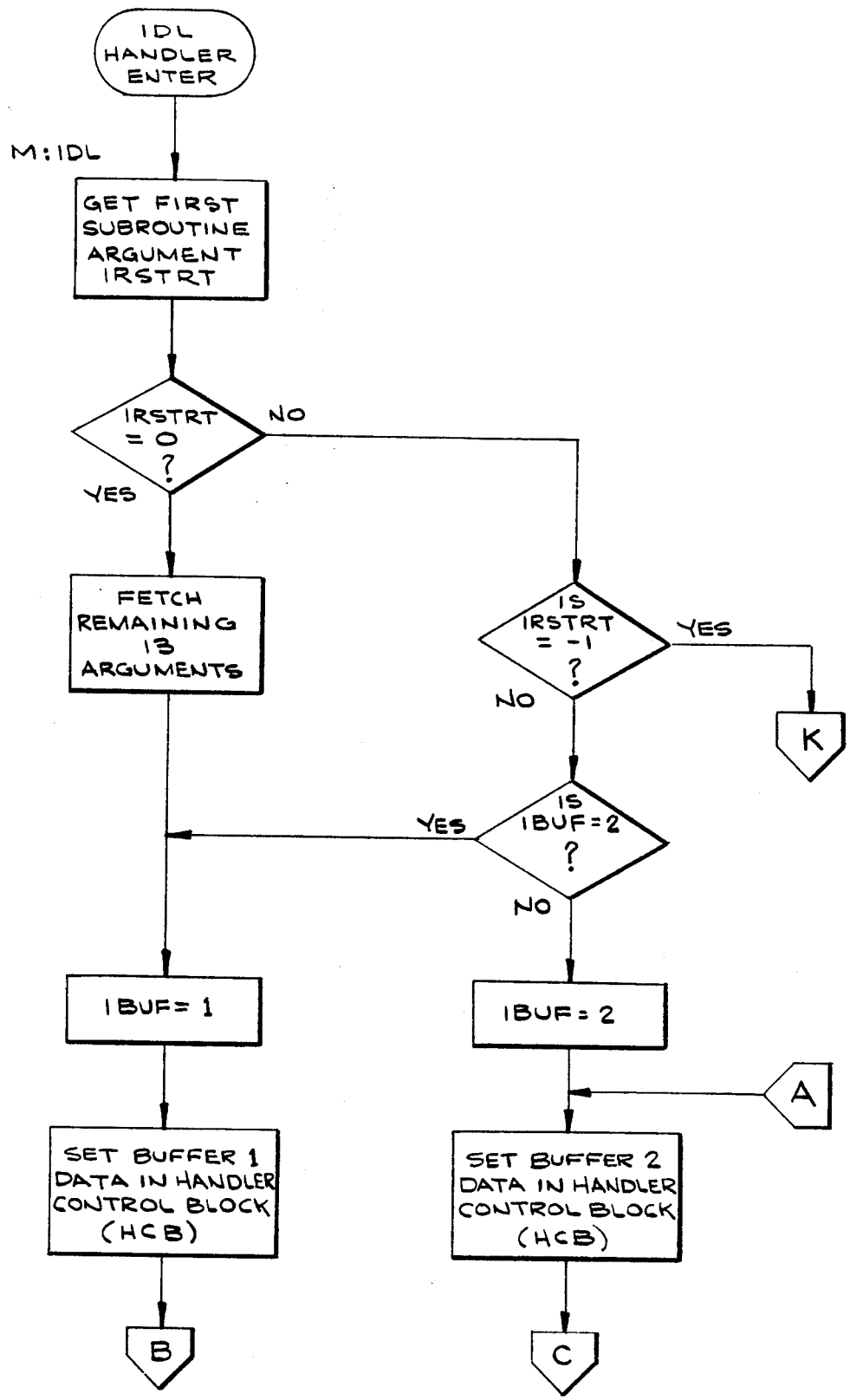
Figure 7D:
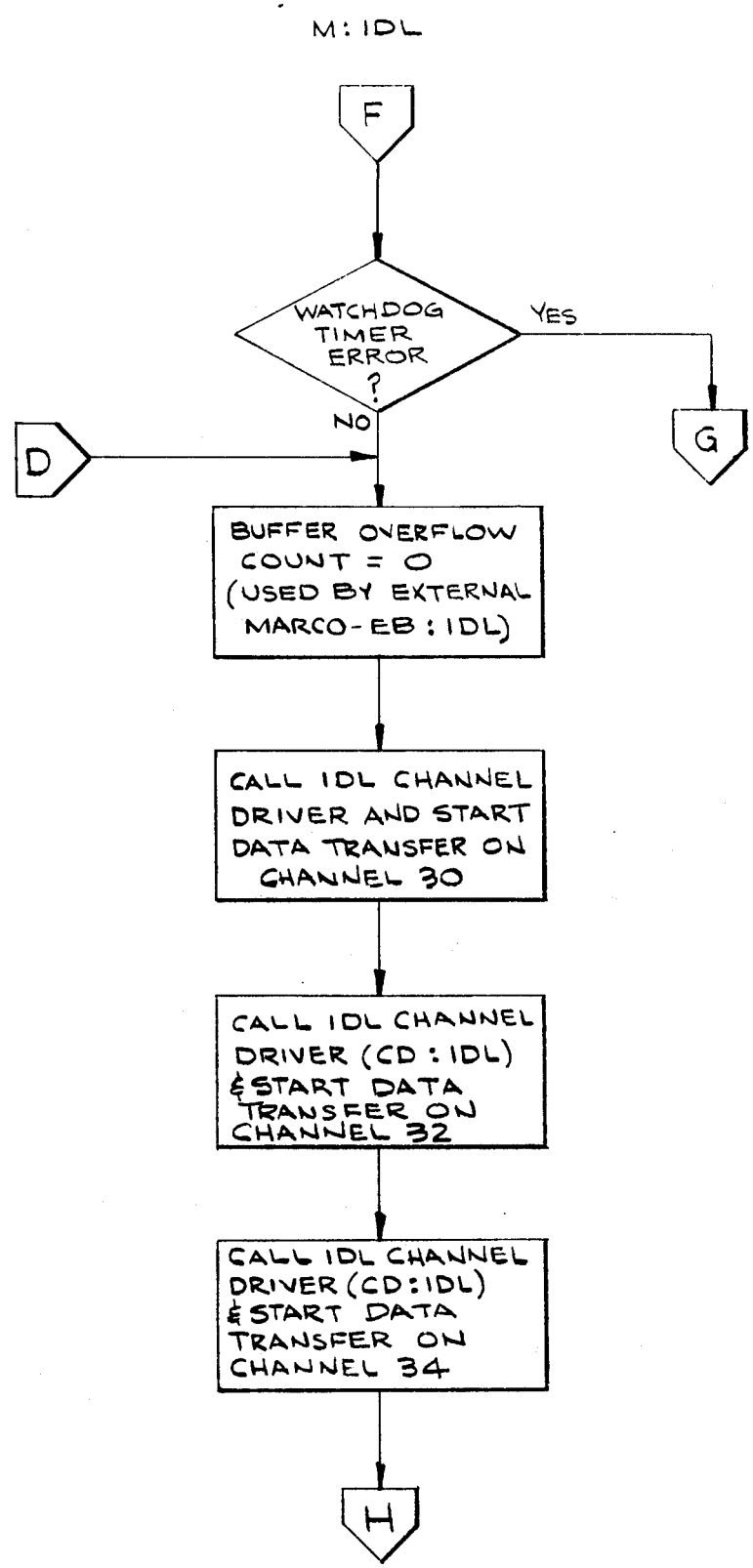
Figure 7E:
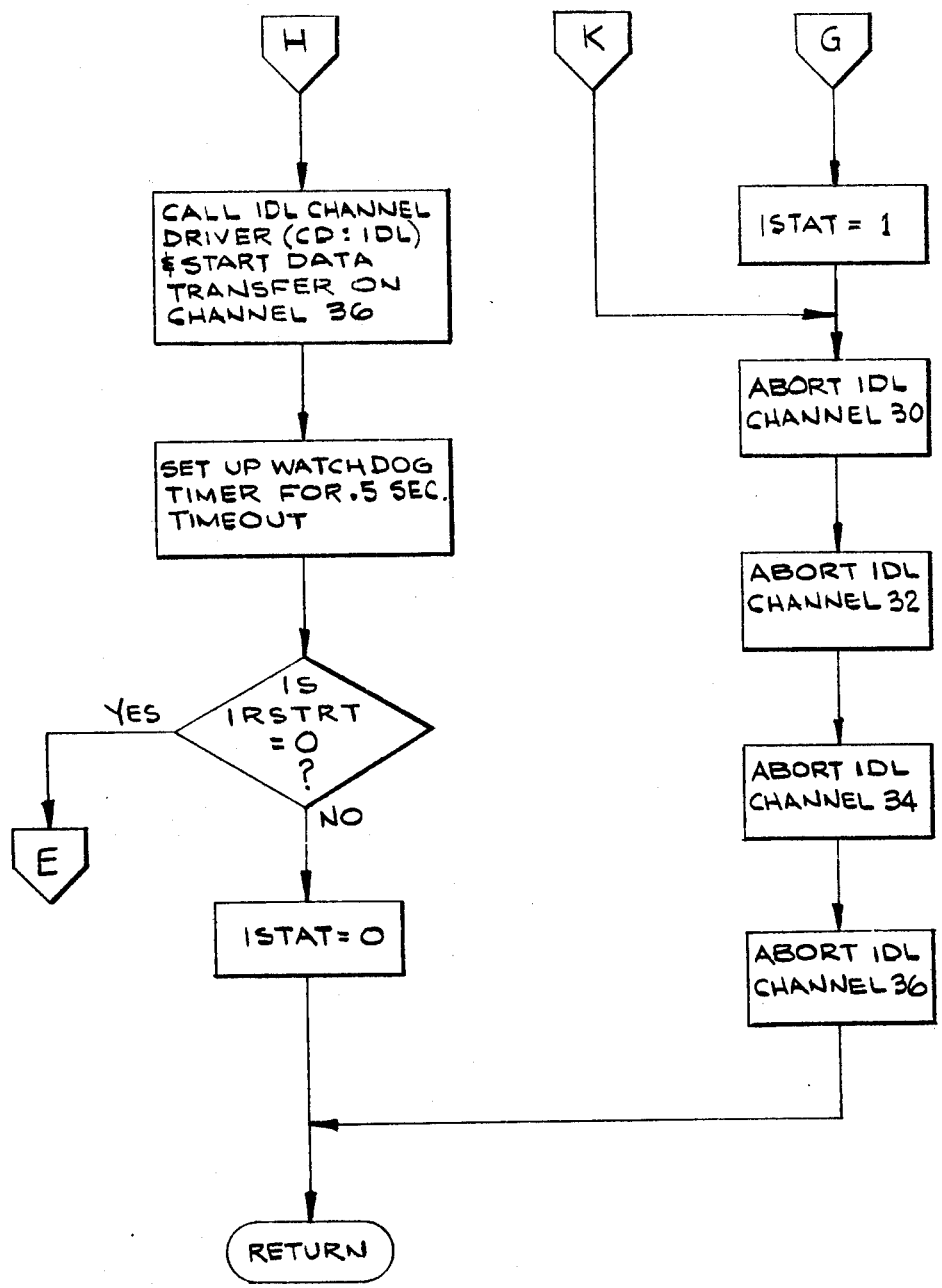

DISC MAP, see FIG. 5. Program address in disc storage 192.

CORE MAP, see FIGS. 6A, B. Program address in hexadecimal core storage 194.

SERVICE PROGRAMS (198)

IDL Handler, M:IDL, see FIG. 7A–E. This routine handles all data transfers between the IDL hardware (channels 30, 32, 34 and 36) and the gage data input subroutine - GAGEIN. It communicates to the IDL hardware via the IDL channel driver CD:IDL. A double buffering scheme is used to speed up the total data transfer time by initiating an additional IDL transfer on all four channels to a second data buffer just before exiting from the handler. In this way data can be transferred into this second buffer by the IDL hardware using service request interrupts SRI's executed in the out-of-sequence range while the gage software is busy processing data from the first buffer. When this processing is completed, the handler is re-entered. If the data transfer on the second buffer is not complete, the task is suspended until the IDL external MACRO routine detects four buffer overflow interrupts. The task is unsuspended by the IDL external MACRO routine EB:IDL when 4 buffer overflows have been counted. If the data transfer on the second buffer is complete, or after the task is unsuspended by EB:IDL, the buffers are effectively switched and a data transfer using buffer 1 is initiated and an exit is made from the handler. The gage software now processes the data in buffer 2 and repeats the above sequence.

A watchdog timer with a 0.5 second timeout is set before initiating each IDL transfer. If four buffer overflows are not returned within this time period, the clock routine will unsuspend the task and sets the variable ISTAT=1 to indicate an IDL transfer timeout error.

| FIG. NO. | FLOW CHART IDENTIFICATION | USED OFF-LINE | ON-LINE |
|---|---|---|---|
| | MAPS (197) | | |
| 5 | DISC MAP | X | |
| 6A,B | CORE MAP | X | X |
| | SERVICE PROGRAMS (198) | | |
| | IDL HANDLER | | |
| 7A–E | M:IDL | X | X |
| 8 | CD:IDL | X | X |
| 9 | EB:IDL | X | X |
| 10A,B | GAGTSK | X | |
| 11A,B | SUBCLL | X | |
| 12 | GAGTRN | | |
| | BAR GAGE DATA PROGRAM (199) | | |
| 13A–D | GAGEIN | X | X |
| | COMPENSATION PROGRAMS (200) | | |
| 14A–C | GAGMAP | X | |
| 15 | CORDAT | X | |
| 16 | ZERO | X | |
| 17A–C | MAPRNT | X | |
| 18 | GAGTPC | X | X |
| 19 | CMPNST | X | X |
| | PROFILE & POSITION PROGRAMS (203) | | |
| 20 | ENCNGL | X | X |
| 21 | GAGPOS | X | X |
| 22A–D | PROFIL | X | |
| 23A–B | PLOT | X | |
| 24A–B | GAGPLT | | X |
| 25 | HEADER | | X |
| 26A–C | GAGPRO | | X |
| 27 | PROFILE INTERFACE WITH CONTROL SYSTEM | X | |

The variable IBUF is set by this routine to indicate which buffer, 1 or 2, contains data from the last IDL transfer. The variable IRSTRT must initially be set to 0 by the calling task so that this routine knows when entry has been made for the first time. When IRSTRT=0, the double buffering mechanism is initialized. This routine then sets IRSTRT=1 to indicate that the double buffering operation is in progress. If entry to the handler is made with IRSTRT=−1, an abort IDL command is sent to all four IDL channels to stop any transfer in progress. This command is usually initiated by the calling task before doing a call exit so that all IDL transfers are halted.

This routine calls the IDL channel driver CD:IDL and utilizes the IDL external MACRO routine EB-:IDL. Therefore these routines must be linked with the IDL handler M:IDL.

Figure 8:
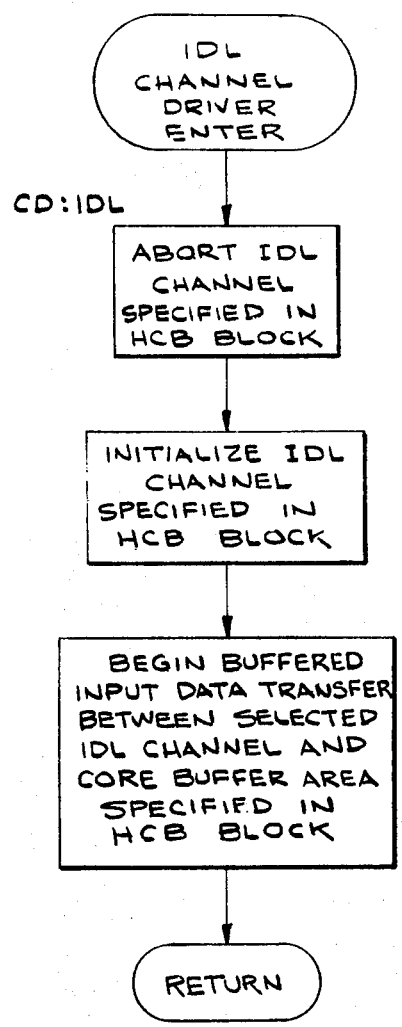

IDL Handler, CD:IDL, See FIG. 8. This routine is used to transfer data from the handler control blocks (HCB) defined in the IDL handler M:IDL to the IDL hardware (channels 30, 32, 34, 36). Control is transferred to this routine by loading the address of the HCB into the B register and jumping to CD:IDL (CD:IDL must be declared external). The HCB is a 9 word table having the following format:

| Word No. | Explanation | Example Using Channel 30 |
|---|---|---|
| 0 | Forced Buffer Input IDL Code | DAT X' B30' |
| 1 | Abort IDL Code | DAT X' F30' |
| 2 | Return Address - 1 | ADL RTR1-1 |
| 3 | Blank | DAT 0 |
| 4 | Buffer Input IDL Code | DAT X' 530' |
| 5 | Core Location Containing Addr. to data | DAT X' 11FB' |
| 6 | Number of Words to be Transferred | DAT 20 |
| 7 | Address of Data Buffer | SIZE 1 |
| 8 | SRI Address Vector (100+SRI × 2) | DAT 354 |

This routine performs three functions using the HCB table. First, an abort code (HCB - word 1) is sent out on the I/O subsystem. The lower seven bits of this word define the channel number to be aborted. Second, a forced buffer input (HCB - word 0) is sent out on the I/O subsystem. This command initializes the IDL hardware on the selected channel. Third, the buffered input transfer code is sent out on the I/O subsystem to initiate the data transfer. The data is transferred into core memory from the selected IDL channel via service request interrupts (SRI). The pointers and counters used by the SRI's are set up by this routine using data supplied in the HCB's.

Figure 9:
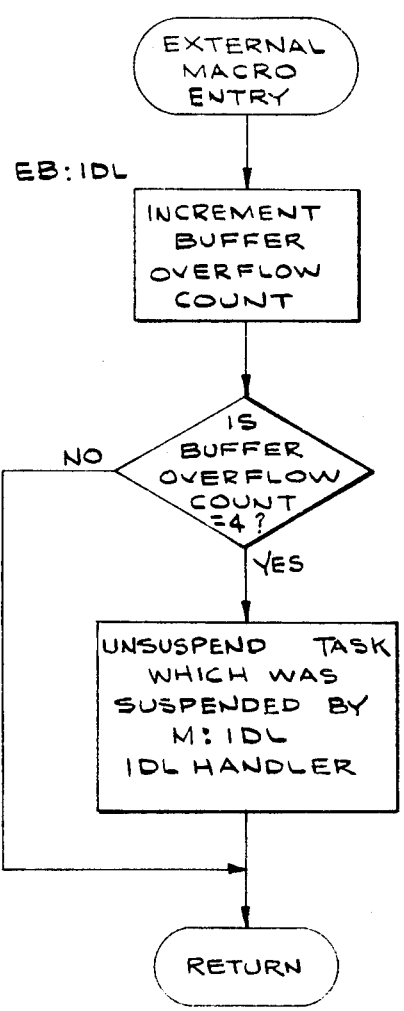

IDL Handler, EB:IDL, see FIG. 9. This routine is called by the POS/1 buffer overflow service request interrupt routine in the out-of-sequence instruction range in response to buffer overflow interrupts which occur when a buffered input data transfer on any of the IDL channels 30, 32, 34 or 36 is completed. Each entry to this routine causes the buffer overflow count word (ECB7) in the external MACRO control block to be incremented. When this count reaches 4, the task which was suspended by the IDL handler M:IDL is unsuspended. If this count is not 4, return is made to the POS/1 buffer overflow exit routine M:BOX and the state of the suspended task is unchanged. Thus, when the IDL handler M:IDL requests data from all four IDL channels it clears the buffer overflow count and suspends the task. It will be unsuspended when the IDL external MACRO routine counts four completion buffer overflow interrupts.

Figure 10A:
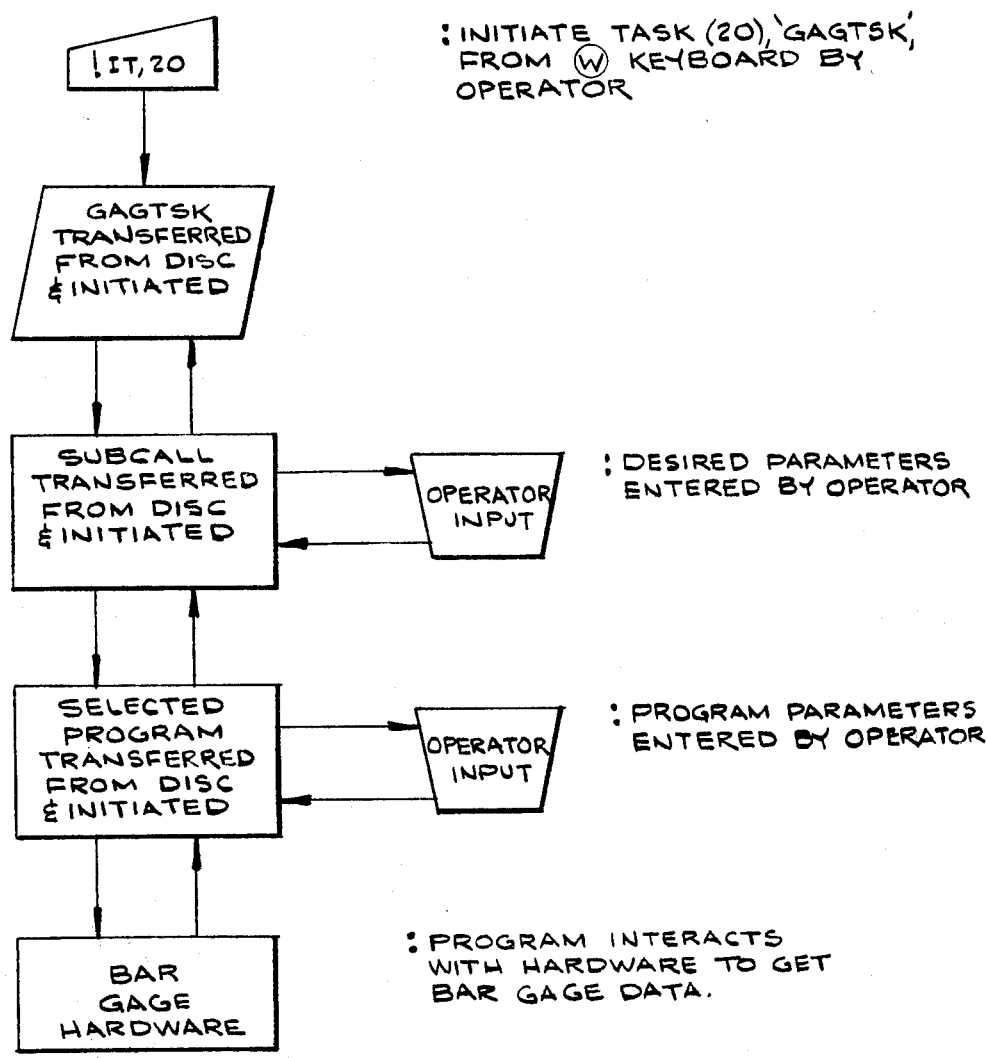
Figure 10B:
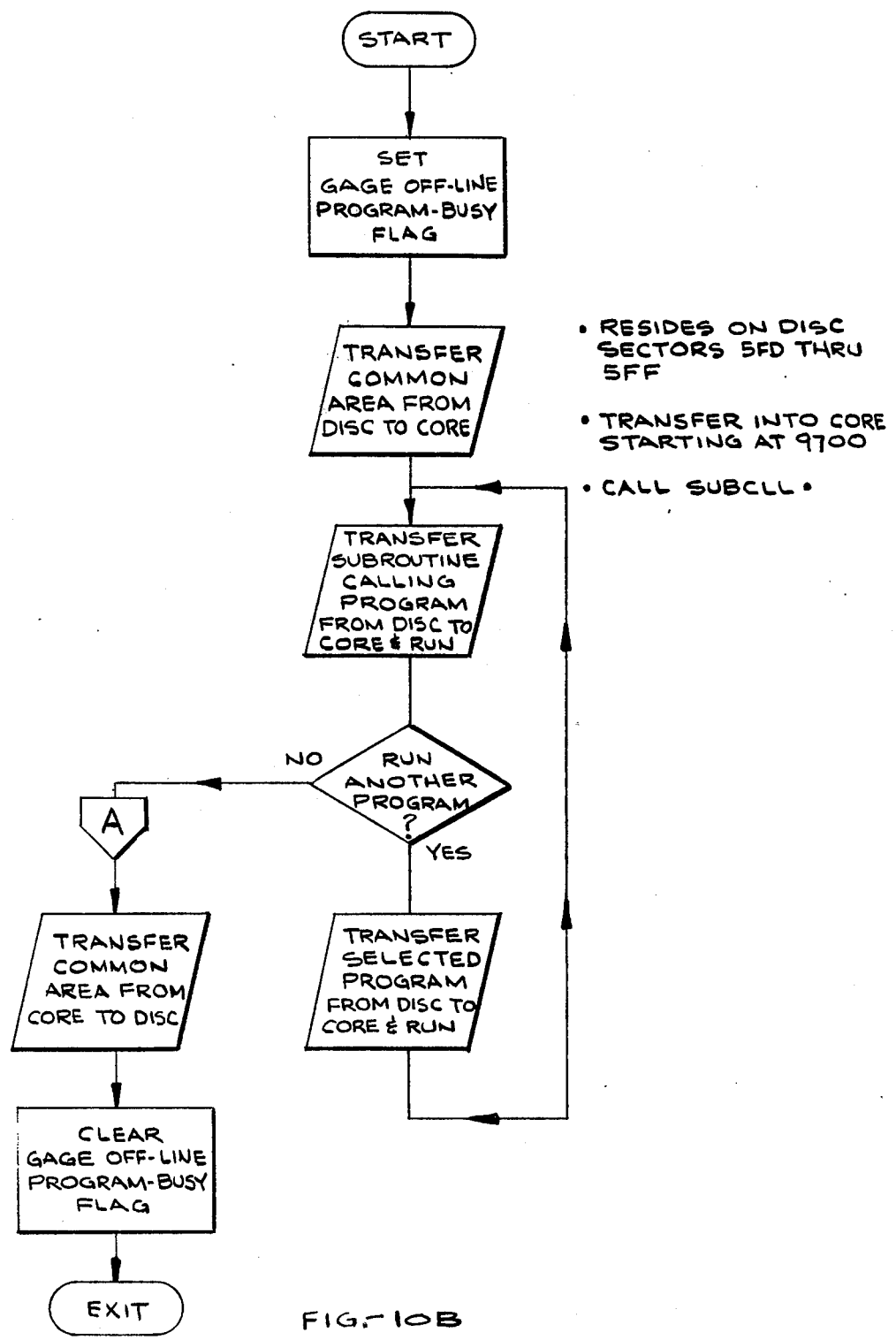

GAGTSK, see FIGS. 10A–B. This disc resident task (Task 20) is an off-line task designed to read disc resident off-line gage subroutine overlays into core. It transfers control to them in response to mnemonic parameters passed to it by the operator interactive subroutine caller overlay SUBCLL. All programs and their mnemonics are described in the listing of the subroutine SUBCLL. GAGTSK also transfers a disc resident common area into core, and, if disc sector switch 12 is write enabled, writes the updated common area back to the disc when exiting from the task.

An off-line busy flag IGAGOF is set on entry to this task, and is cleared upon exit.

SUBCLL, see FIGS. 11A–B. This disc resident subroutine is an overlay, run in the off-line mode, by means of which an operator may interact with the gage off-line system to run any of the available off-line bar diameter gage programs. It is transferred from disc to core and run by the off-line gage task GAGTSK (Task 20) by means of a system monitor disc-read-and-transfer-control routine. Operator entered mnemonics determine subroutine disc sectors which are returned as subroutine parameters to GAGTSK, which in turn transfers and runs the desired subroutine overlay. Subroutine functions are described in this program listing, and are available to the operator in response to his request for assistance.

Figure 12:
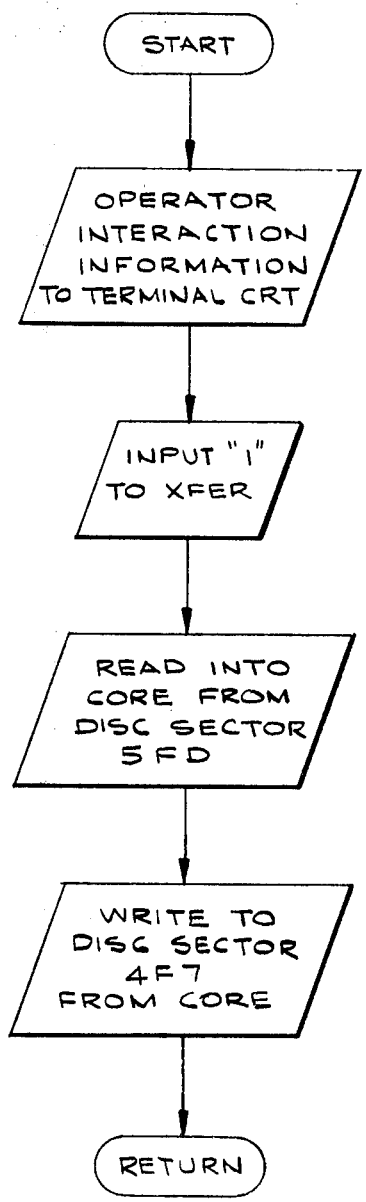
Figure 13A:
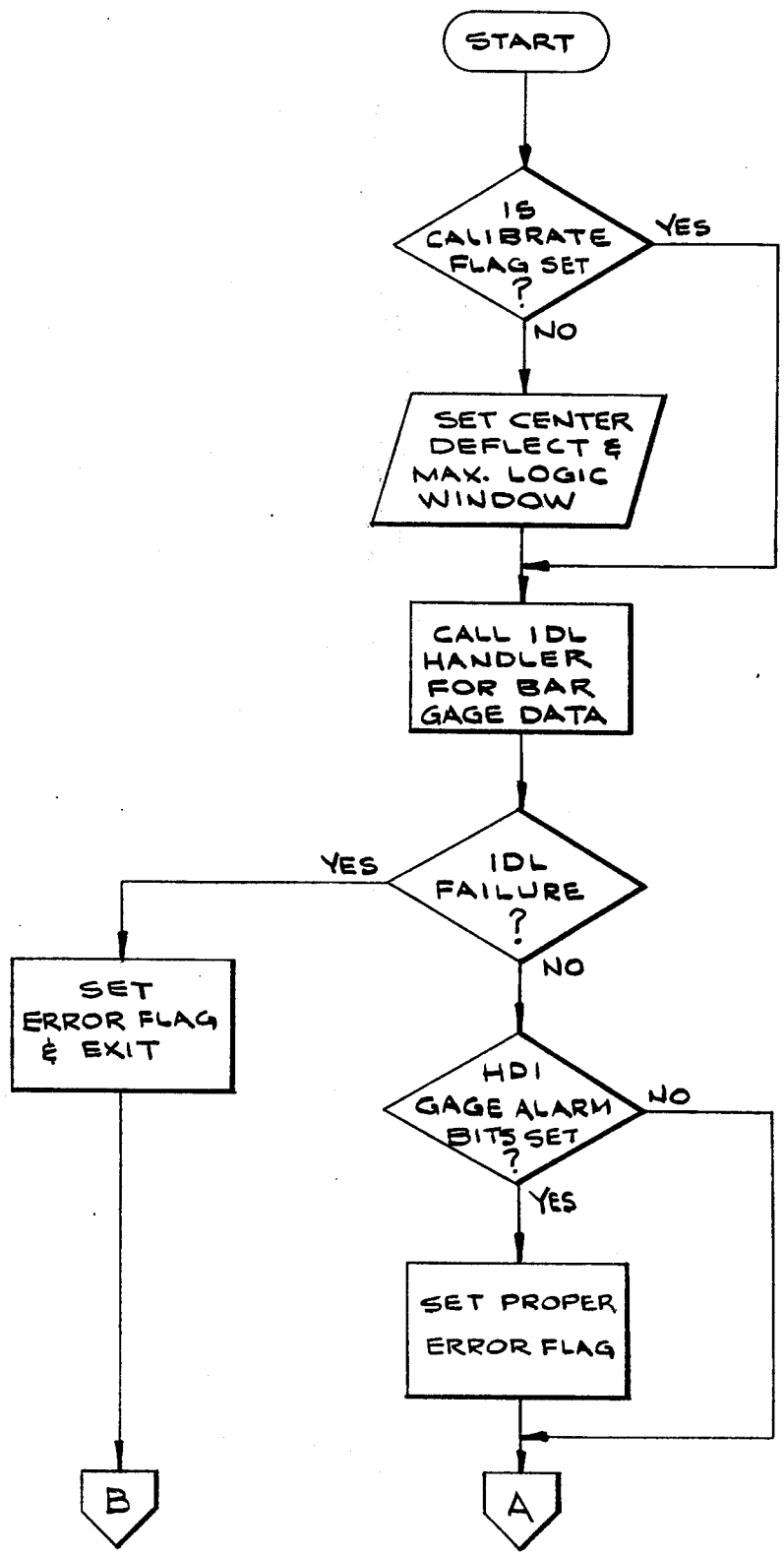
Figure 13D:
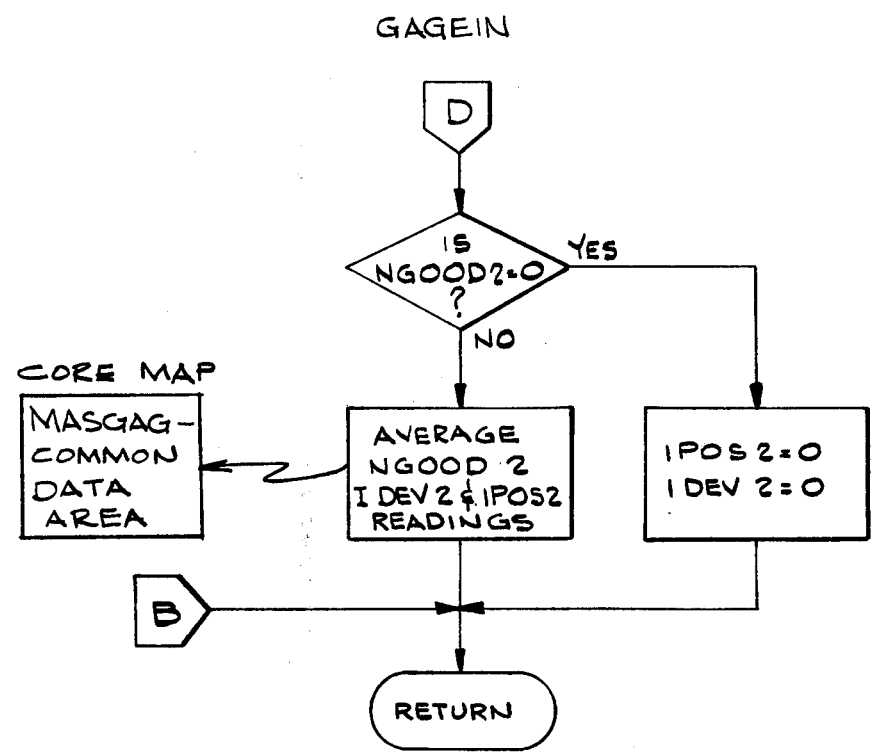

GAGTRN, see FIG. 12. This program runs in the gage off-line system. It transfers the 572 word gage data block from disc area 5FD to control system disc area 4F7. It performs a disc-core-disc transfer using the gage common area for intermediate storage. Disc switch 10 must be write enabled.

BAR GAGE DATA PROGRAM (199)

GAGEIN, see FIGS. 13A–D. This auxiliary subroutine is always appended to any subroutine requiring bar gage data. It calls the IDL handler (M:IDL, CD:IDL EB:IDL), also appended, to actually acquire the data, and the compensate subroutine (CMPNST), also appended, if compensation is required. It averages the good readings returned, both bar position and diameter, calculates deviations, and stores the results in common tables. Validity tests are made and error flags set as needed.

COMPENSATION PROGRAMS (200)

Figure 14A:
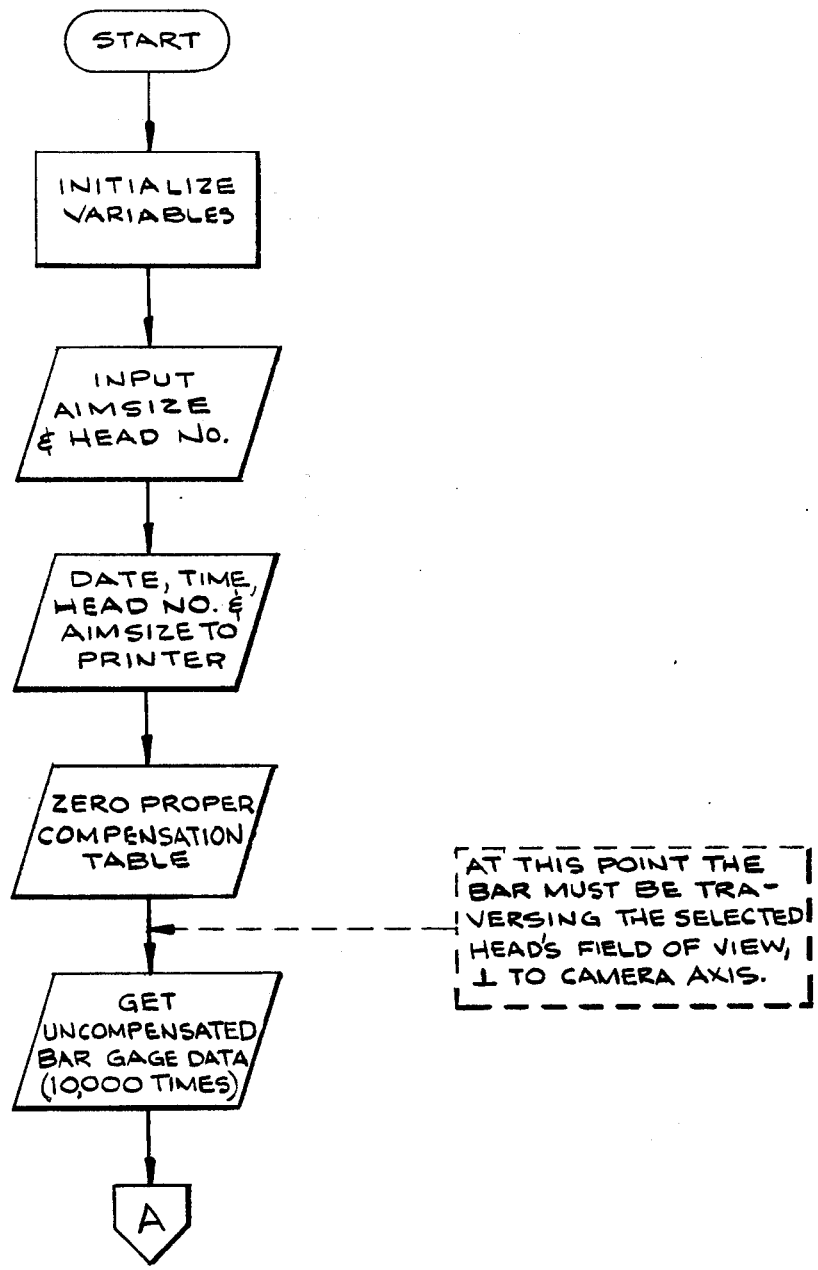

GAGMAP, see FIGS. 14A–C. This disc resident subroutine is an overlay, run in the off-line mode, which generates a set of compensation tables used by on-line bar diameter gage tasks and subprograms, and those off-line gage programs requiring compensated size data. The tables reside in a common area, and are used to compensate for field-of-view nonlinearities. The tables are formatted and output to printer 63. This program is required to be run before any bar-diameter data can be considered valid. It is invoked by the subroutine SUBCLL, and requires operator interaction.

Each map consists of 256 entries corresponding to the 256 possible bar positions. Element one represents the bottom of a total 4.096" field and element 256 represents the top of the field. Each element contains correction data to be subtracted from the measured bar size based on the positions of the top and bottom edges of the bar. The actual correction is performed by subroutine CMPNST. Using the bar edge positions rather than the center position allows the map to be used for all sizes of bar 10.

During the map building procedure, a ½" machined sample bar 10 is moved ±1.5" back and forth in a plane perpendicular to the optical axis. While bar 10 is being moved, GAGMAP is executed in the off-line calibration system. This program processes 10,000 measurements and calculates the average deviation at each increment of bar position. These intermediate results are stored in a 256 element table called ISUM.

The final compensation map based on bar edge positions is generated from the ISUM table by the following steps:

1. The compensation map is cleared.
2. A computer simulation is performed in which an imaginary ½" bar 10 is positioned at 0.016 inches above the center of the field-of-view (slot 129). The positions of the top and bottom bar edges 82, 83 are calculated as follows:

$$\text{Top Edge 83} = \frac{[\text{field-of-view center position} + 0.016 + (\text{bar size}/2)]}{0.016} \quad (Eq.1)$$

$$\text{Bottom Edge 82} = \frac{[\text{field-of-view center position} + 0.016 - (\text{bar size}/2)]}{0.016} \quad (Eq.2)$$

EXAMPLE:

$$\text{Top Edge 83} = (2.048'' + 0.016'' + 0.5''/2) \div 0.016'' = 144 \quad (Eq. 3)$$

$$\text{Bottom Edge 82} = (2.048'' + 0.016'' - 0.5''/2) \div 0.016'' = 113 \quad (Eq. 4)$$

3. The value stored in the map at the upper edge 83 position (144) is the sum of the deviation stored in ISUM table corresponding to the position of the center of bar 10 (129) and the value stored in the map at the lower edge 82 position (113).

IMAP (upper edge 83 position) = ISUM (center bar position) + IMAP (lower edge position)  (Eq. 5)

IMAP (144) = ISUM (129) + IMAP (113)  (Eq. 6)

4. Steps 2 and 3 are repeated by incrementing the center position of the bar 10 to 0.032" above the center of the field-of-view, then 0.048", 0.064", etc. This is repeated until the upper edge 83 of bar 10 goes beyond −1.5" above the center of the field-of-view.

| | | |
|---|---|---|
| IMAP (145) = | ISUM (130) + | IMAP (114) |
| IMAP (146) = | ISUM (131) + | IMAP (115) |
| IMAP (147) = | ISUM (132) + | IMAP (116) |
| . | | |
| IMAP (220) = | ISUM (205) + | IMAP (189) |
| IMAP (221) = | ISUM (206) + | IMAP (190) |

The upper half of the map is now complete.

5. The lower half of the map is filled in the same manner. Based on the same ½" sample bar 10 located at the center of the field-of-view (128) the positions of the upper and lower edges 83, 82 are calculated.

$$\text{Top Edge 83} = (\text{field-of-view center} + \frac{\text{bar size}}{2}) \div 0.016 \quad (Eq.7)$$

$$\text{Bottom Edge 82} = (\text{field-of-view center} - \frac{\text{bar size}}{2}) \div 0.016 \quad (Eq.8)$$

$$\text{Top Edge 83} = (2.048 + 0.5/2)/0.016 = 143 \quad (Eq. 9)$$

$$\text{Bottom Edge 82} = (2.048 - 0.5/2)/0.016 = 112 \quad (Eq. 10)$$

6. The map value for lower edge 82 of the bar (112) is the sum of the deviation stored in ISUM corresponding to the position of the center of the bar (128) and the map value stored at upper edge 83 of bar 10 (143).

IMAP (lower edge 82 position) = ISUM (center bar position) + IMAP (upper edge 83 position)  (Eq. 11)

IMAP (112) = ISUM (128) + IMAP (143)  (Eq. 12)

7. Steps 5 and 6 are repeated by successively decrementing bar 10 position by 0.016" from the center of the field-of-view until the lower edge 82 of bar 10 goes beyond −1.5" from the center of the field-of-view.

| | | |
|---|---|---|
| IMAP (111) = | ISUM (127) + | IMAP (142) |
| IMAP (110) = | ISUM (126) + | IMAP (141) |
| IMAP (109) = | ISUM (125) + | IMAP (140) |
| . | | |
| IMAP ( 36) = | ISUM ( 52) + | IMAP ( 67) |
| IMAP ( 35) = | ISUM ( 53) + | IMAP ( 68) |

The lower half of the map is now complete.

8. Map positions above 221 and below 35 are not used. These positions correspond to the unused portion of the field-of-view in the shadow of the photocathode tube.

9. Map elements 111 to 143 are zero. This corresponds to an area ±0.25" from the center of the field-of-view.

10. The maps corresponding to camera #1 and camera #2 are shown in FIG. 24C and are stored in a common data area labeled FCOMP1 and FCOMP2 respectively.

Figure 15:
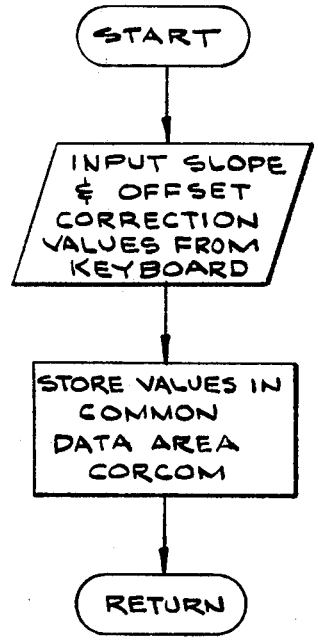

CORDAT, see FIG. 15. This program runs under the gage off-line system. Its purpose is to allow the operator to enter the slope and offset correction factors for each head. The four variables are:

IMULT1 — Slope correction factor for head 1
IOFST1 — Offset correction factor for head 1
IMULT2 — Slope correction factor for head 2
IOFST2 — Offset correction factor for head 2 Slope correction is added to all bars by the field-of-view compensation subroutine CMPNST based on the following formula:

Size = (0.5 − Size)*IMULT1

Offset correction is added to all bar sizes by the field-of-view compensation subroutine CMPNST based on the following formula:

Size = Size − IOFST1

Figure 16:
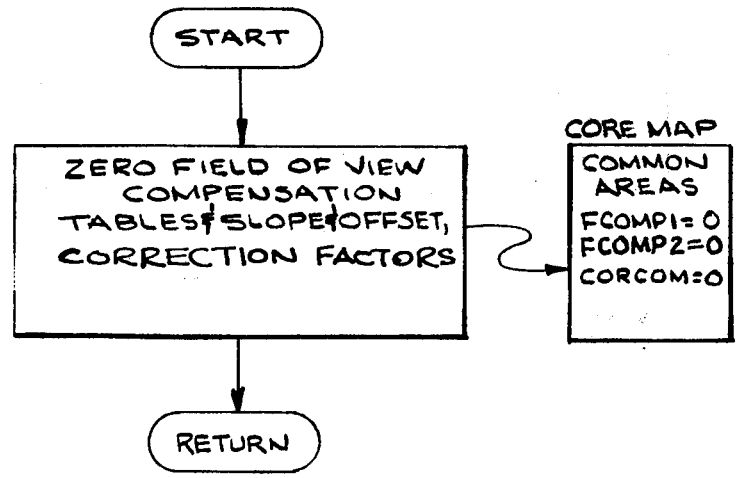

ZERO, see FIG. 16. This program runs in the offline gage system. Its purpose is to zero all compensation maps, all slope and offset correction factors.

Figure 17A:
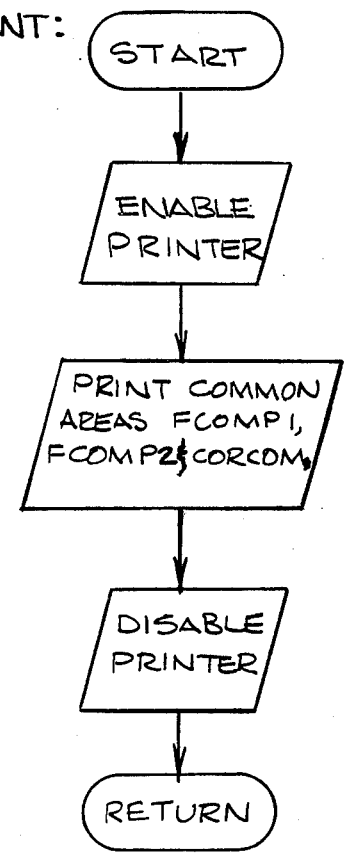

MAPRNT, see FIGS. 17A-C. This program runs under the off-line gage system. It does not require operator intervention. Its purpose is to print the field-ofview compensation maps, slope and offset correction factors, all as shown in FIGS. 17B and 17C.

Figure 18:
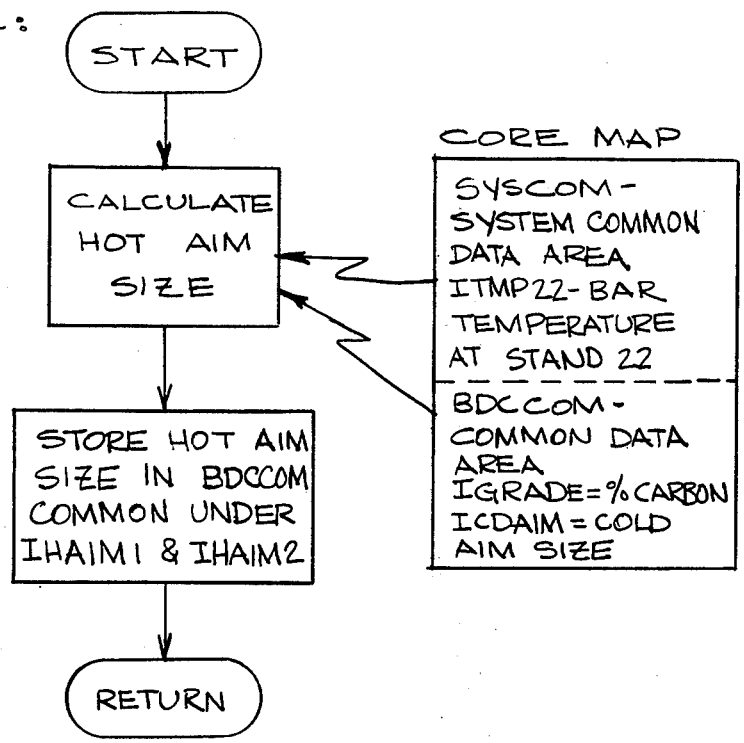

GAGTPC, see FIG. 18. This program calculates hot aim size based on an internally stored compensation equation. Three variables are required for this equation. First, the % carbon is obtained from IGRADE in common area BDCCOM. Second, the bar temperature is obtained from ITMP22 in common area SYSCOM. Third, the cold aim size is obtained from ICDAIM in common area BDCCOM. The calculated hot aim size is stored in IHAIM1 and IHAIM2 in common BDCCOM.

Figure 19:
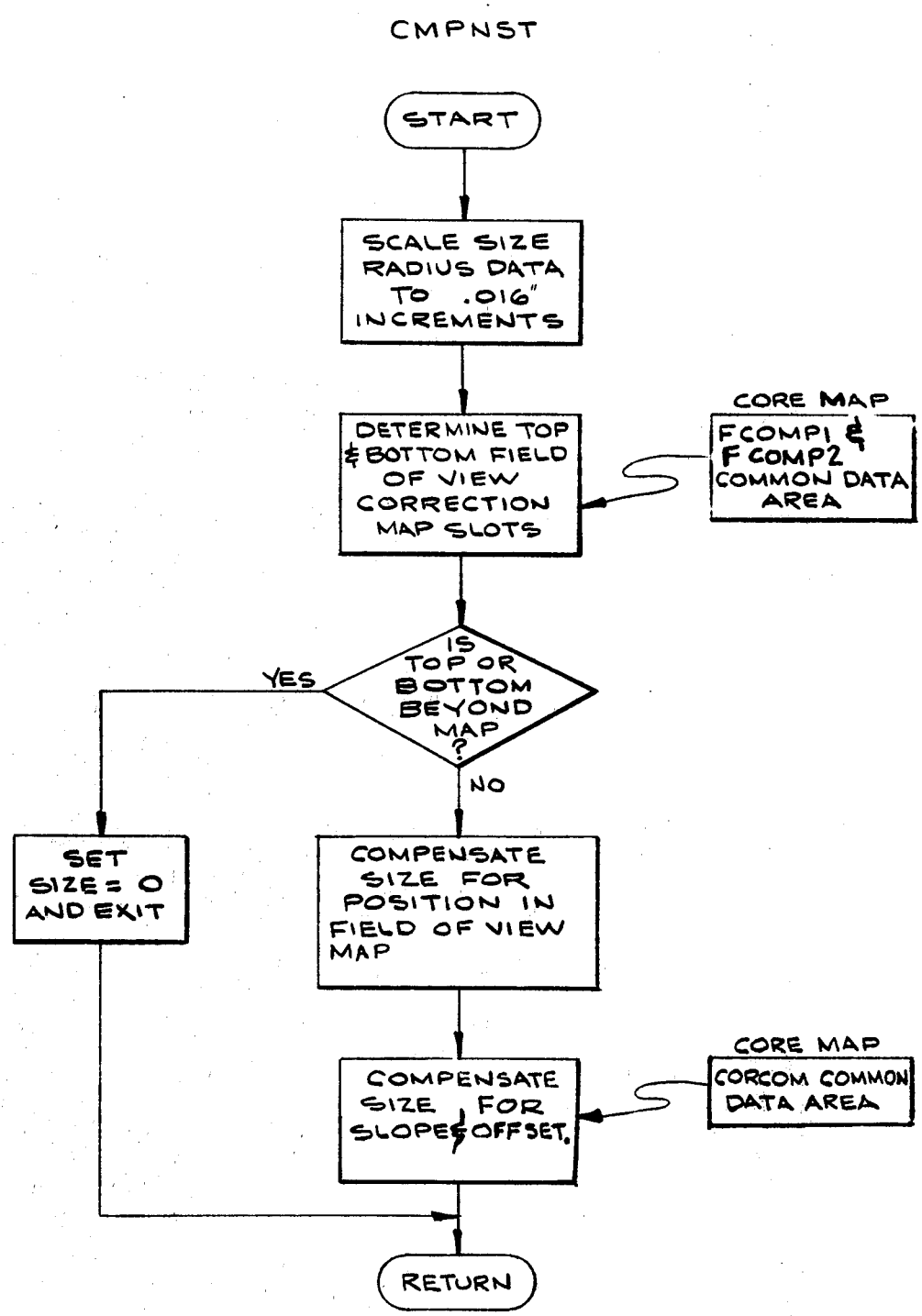

CMPNST, see FIG. 19. This auxiliary subroutine is appended to any subroutine requiring gage diameter data compensation. Specifically, this subroutine linearizes the bar measurement data for its position in the gage field-of-view, and corrects the measurement data for slope and offset data per subroutine CORDAT.

Bar 10 size data from each head is linearized by the CMPNST subroutine using compensation maps FCOMP1 and FCOMP2 generated by off-line program GAGMAP. Compensation is performed by the following steps.

1. The bar size and position data from accumulator 118 are used to determine the positions of the upper and lower edges 83, 82 of the bar 10 in the compensation map as follows:

Upper edge 83 position = (center bar position + bar size/2)/0.016
Lower edge 82 position = (center bar position − bar size/2)/0.016 If the center of a 1" bar is positioned 3/4" above the center of the field of view, the position of the bar center is 2.048" + 0.75" = 2.798". The upper and lower bar edge positions are determined as previously described. That is:

$$\text{Upper Edge 83 Position} = (2.748" + \frac{1.0"}{2}) \div 0.016" = 203 \quad \text{(Eq. 13)}$$

$$\text{Lower Edge 82 Position} = (2.748" - \frac{1.0"}{2}) \div 0.016" = 140 \quad \text{(Eq. 14)}$$

2. The compensation values corresponding to the upper and lower bar edges 83, 82 are obtained from the map and assigned values ICOR1 and ICOR2 respectively.

ICOR1 = IMAP (Upper Edge 83 Position)  (Eq. 15)

ICOR2 = IMAP (Lower Edge 82 Position)  (Eq. 16)

3. If both upper and lower edges 83, 82 are above the center of the field-of-view, then:

Corrected Bar Size = Uncorrected Size − ICOR1 + ICOR2  (Eq. 17)

4. If both upper and lower edges 83, 82 are below the center of the field-of-view, then;

Corrected Bar Size = Uncorrected Size + ICOR1 − ICOR2  (Eq. 18)

5. If upper edge 83 is above the center of the field-of-view and lower edge 82 below, then:

Corrected Bar Size = Uncorrected Size − ICOR1 − ICOR2  (Eq. 19)

PROFILE AND POSITION PROGRAMS (203)

Figure 20:
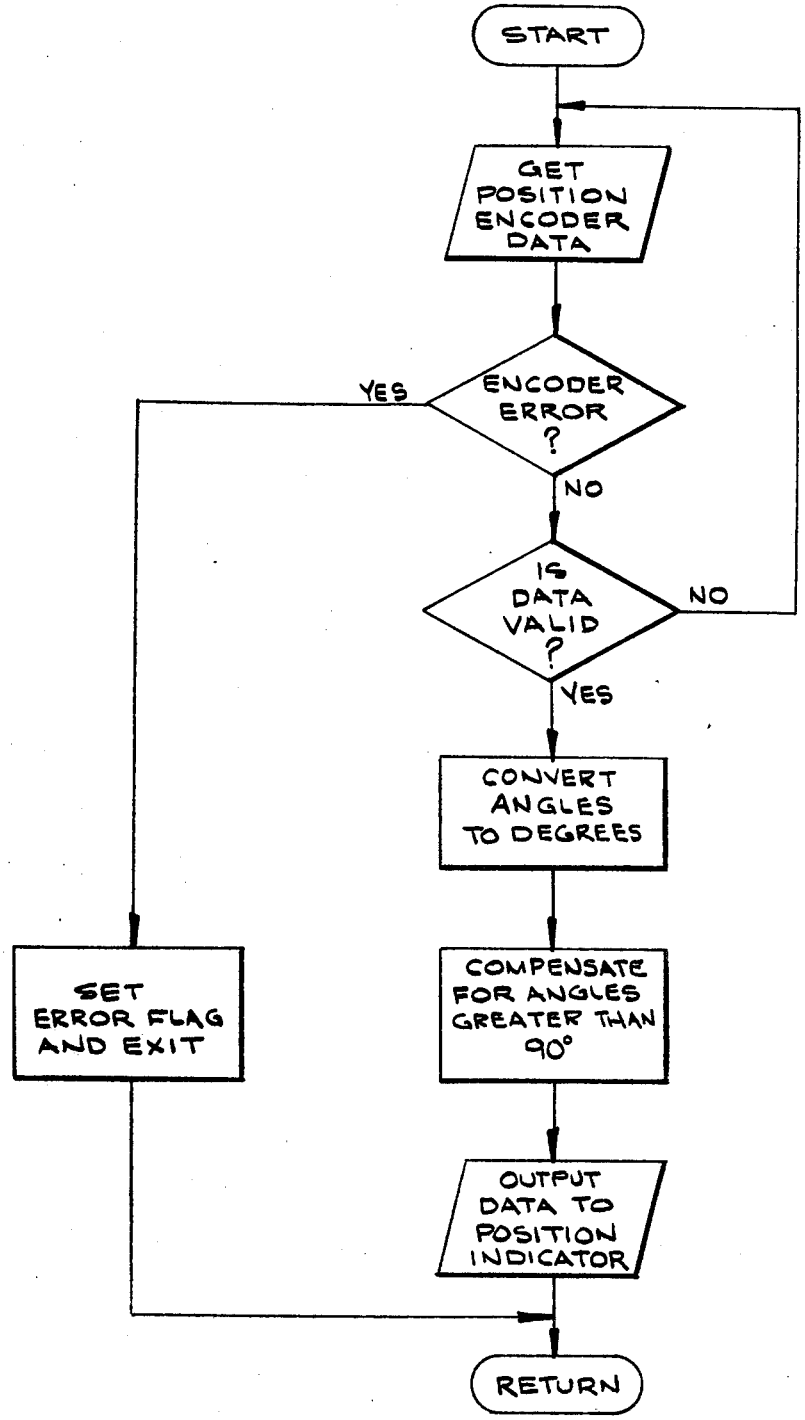

ENCNGL, see FIG. 20. This auxiliary subroutine is appended to any subroutine requiring the angular position of the bar diameter gage heads. It reads the position encoder electronics 23, checks validity, puts both the binary and decimal values of position into common, and sets an error flag in the event of encoder failure.

Figure 21:
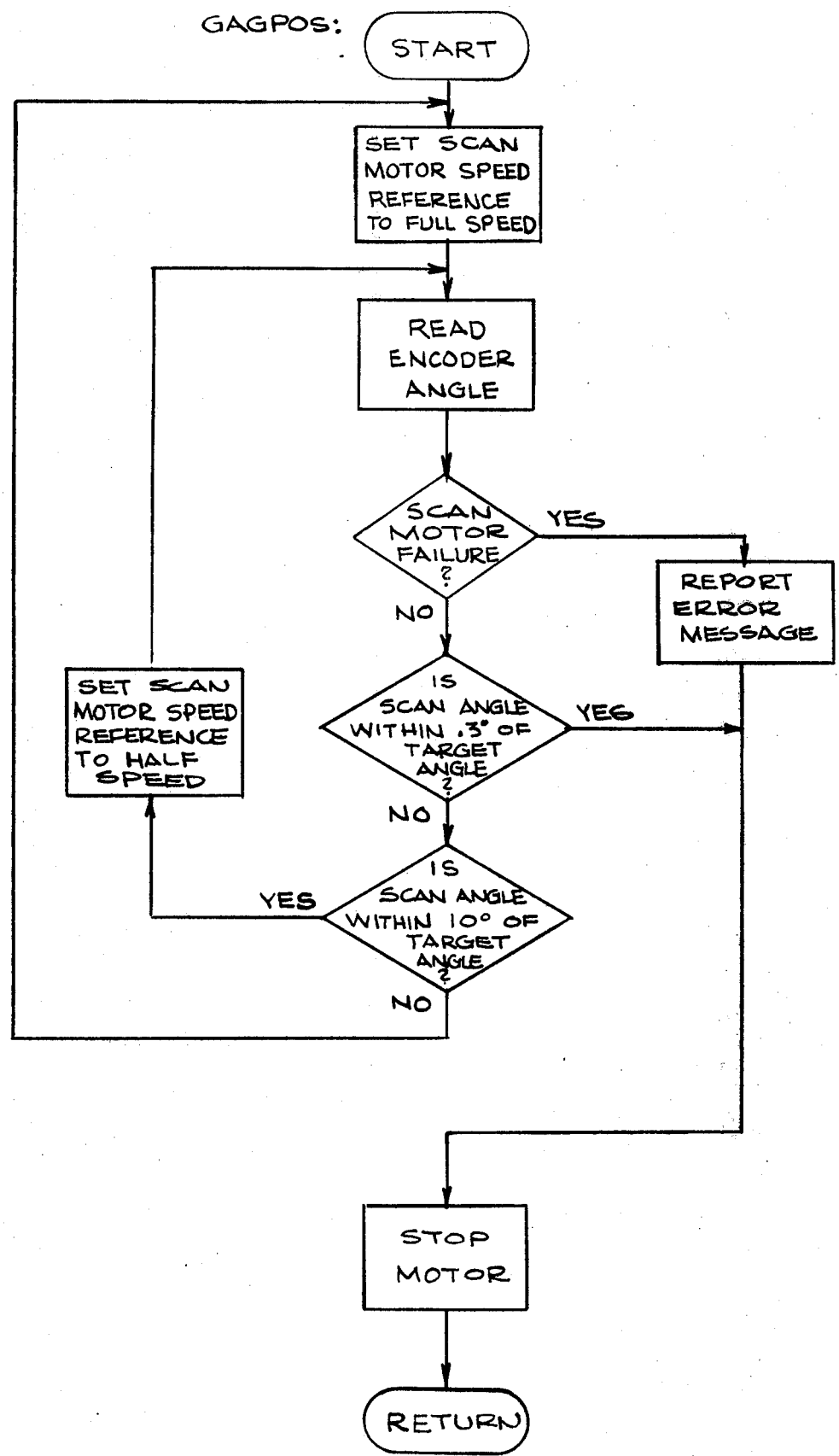
Figure 22A:
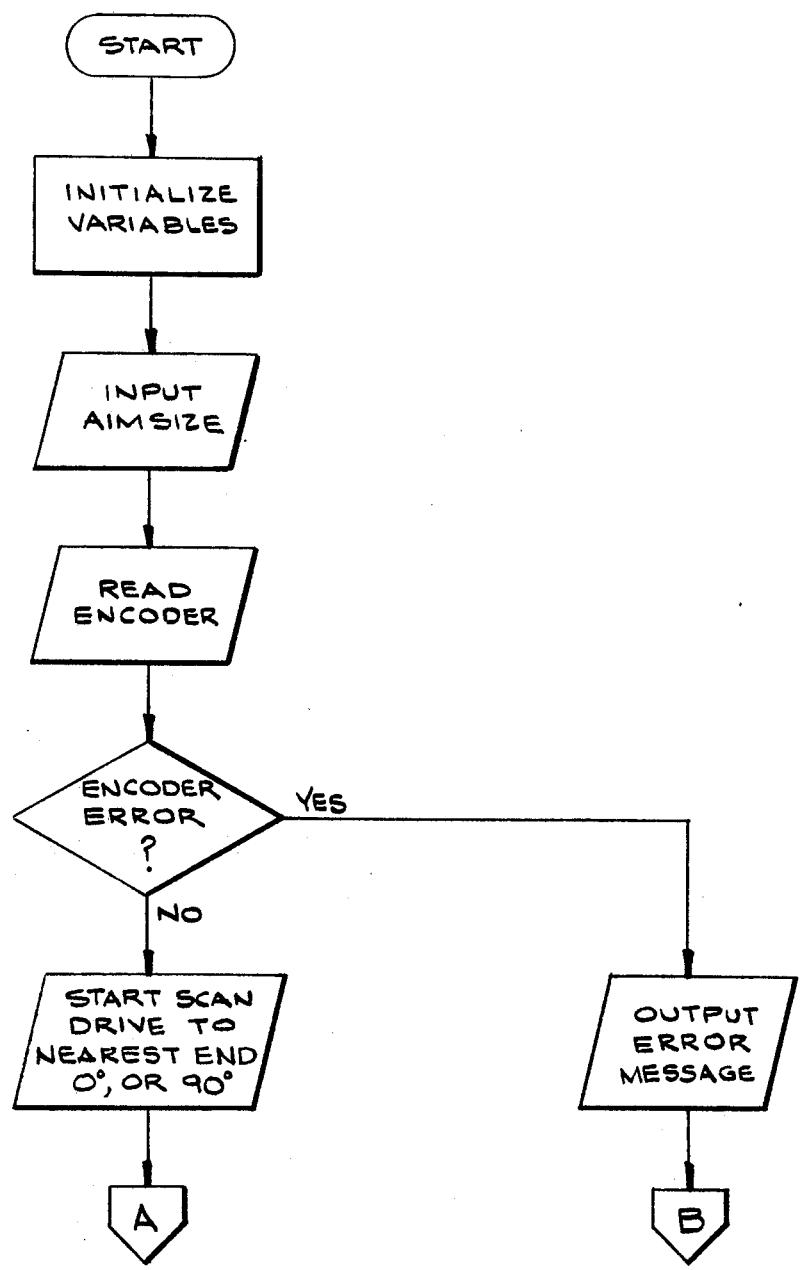
Figure 22B:
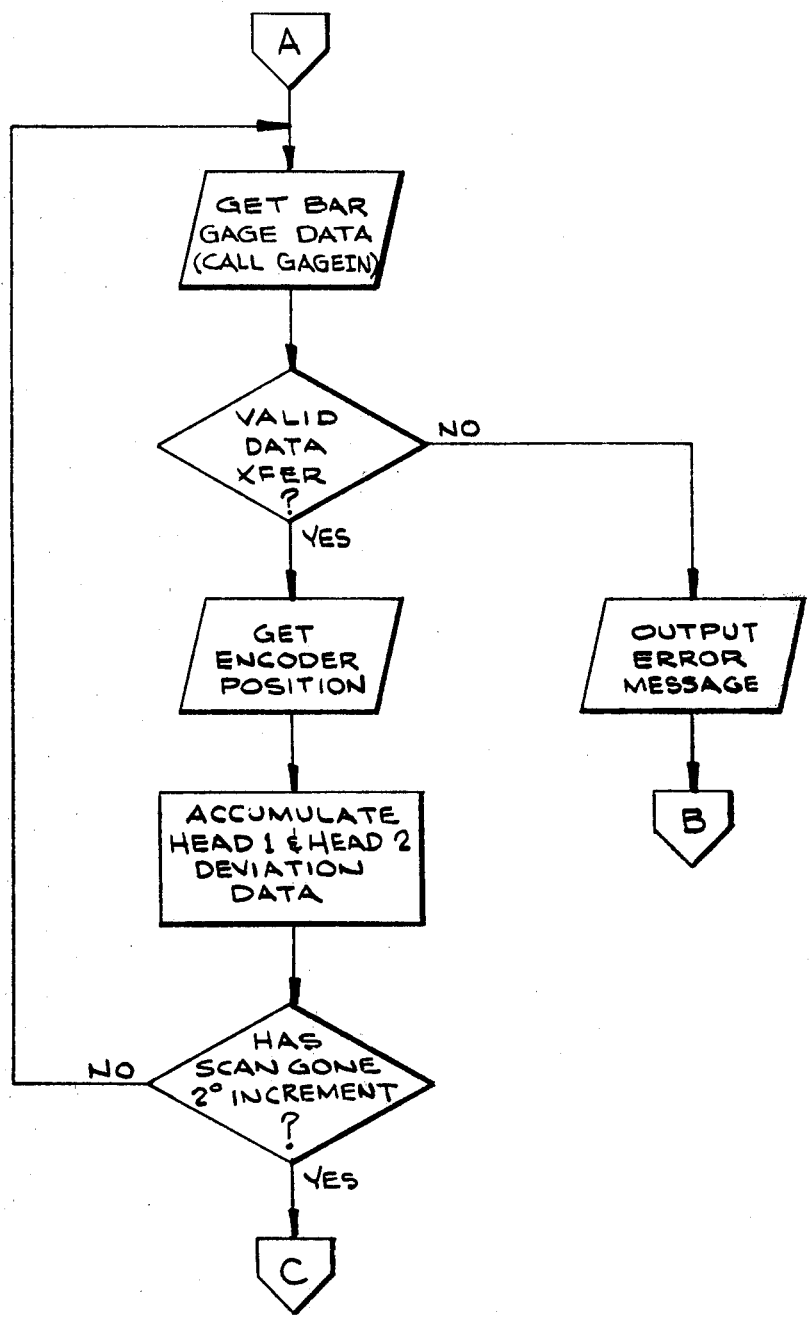
Figure 22C:
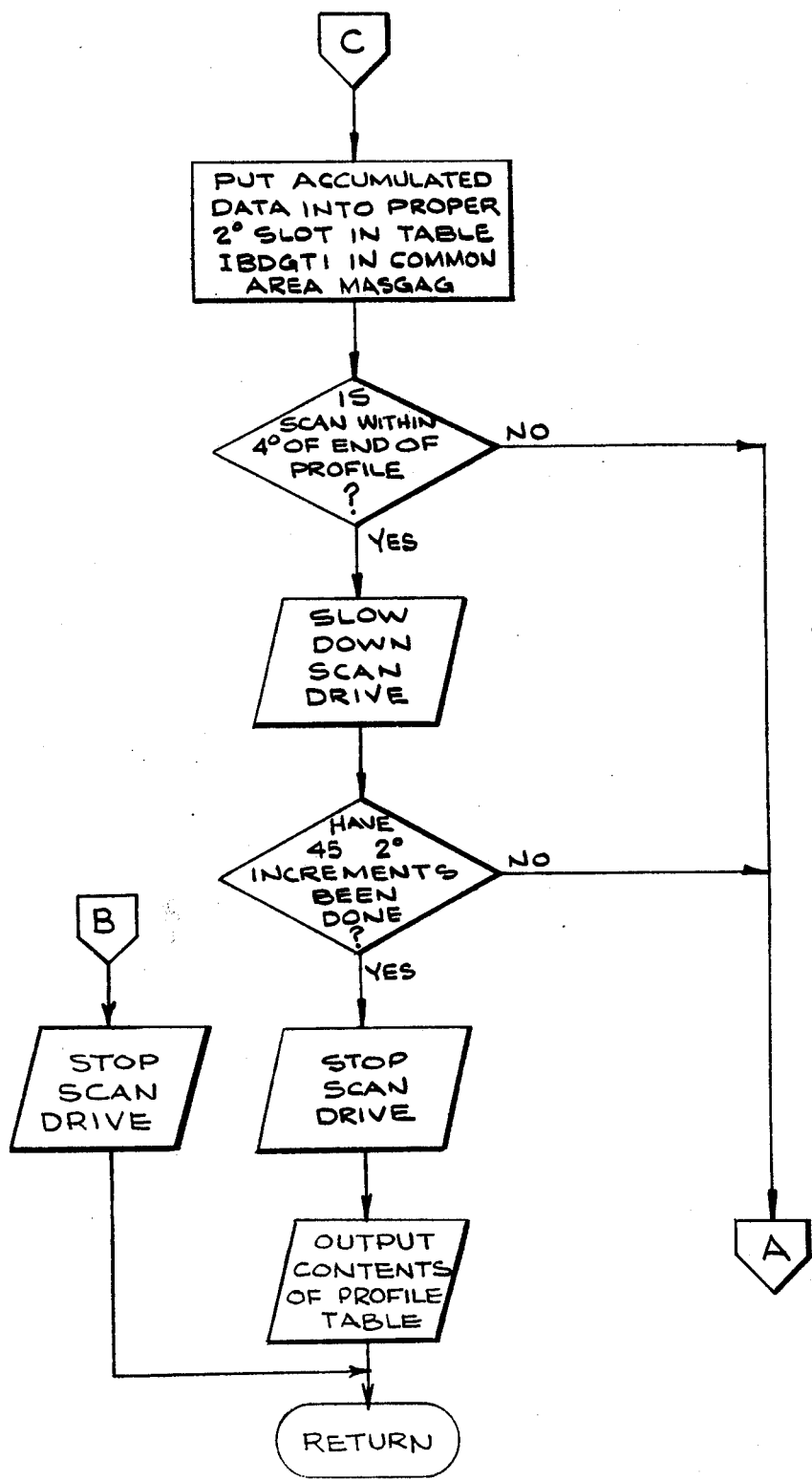

GAGPOS, see FIG. 21. This disc resident subroutine is an overlay. Its purpose is to drive the scanner to an angular position input through the terminal keyboard 60, 63. The following outline will aid in understanding the program:

1. If the target angle is greater than 10 degrees away from the scan position, full speed voltage is fed over cable 29 to scan motor controller 16 to drive toward the target angle. Less than 10 degrees, go to step 3.

2. Continue full speed until scanner is within 10 degrees of target.

3. When within 10 degrees of the target angle, output, to scan motor controller 16, half-speed voltage.

4. When within 0.3 degrees of the target angle, apply zero volts to controller 16, and exit.

The operator is required to enter the target angle via the keyboard.

PROFIL, see FIGS. 22A-D. This program is run under the gage off-line system. It requires operator intervention. Its purpose is to scan the camera through a complete 90 degree cycle and build profile table FIG. 22D containing the deviations for each 2 degree increment IBDGT1 (94). It does not plot this data. The PLOT routine PL run under the off-line system performs this task.

There are three possible error conditions generated.

1. Scan motor failure — indicates that the motor didn't start, or an end of the scan cycle was not found (0 or 90 degrees).

2. Encoder failure — generated if the ready bit was not generated by the encoder.

3. IDL failure — generated if an IDL transfer time-out occurs.

Figure 23B:
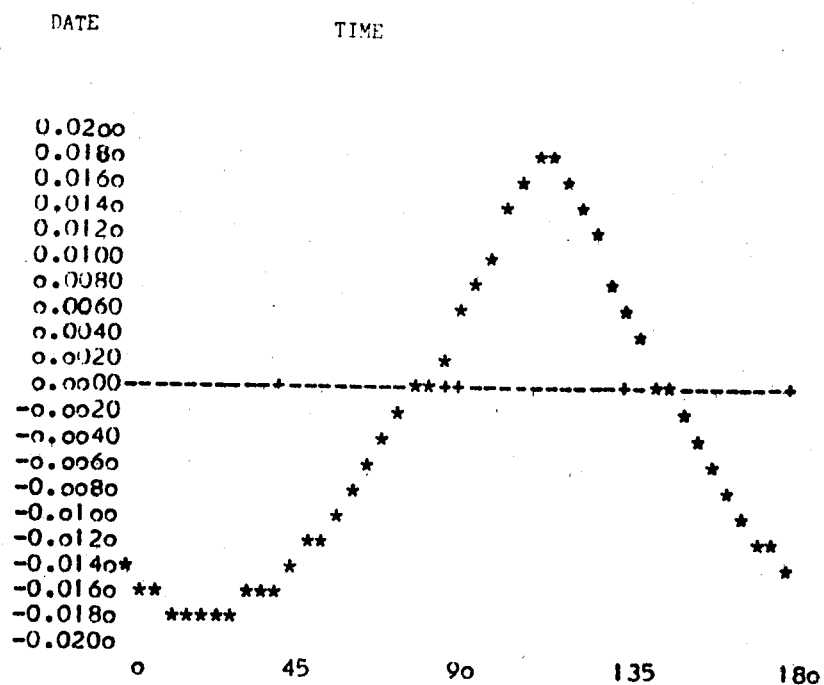

PLOT, see FIGS. 23A-B. This program runs under the off-line gage system. It does not require operator intervention. Its purpose is to plot the data contained in the profile table IBDGT1 (94), see FIG. 23B. The Y-axis is set to 10 rows above the axis and 10 rows below the axis. The scale is floating with a minimum of 0.0002 inches. Deviation is plotted along the Y-axis and angular position of the scanner is plotted along the X-axis in increments of 4 degrees per column. Data points which are blank or out of range are represented by a "#".

Figure 24A:
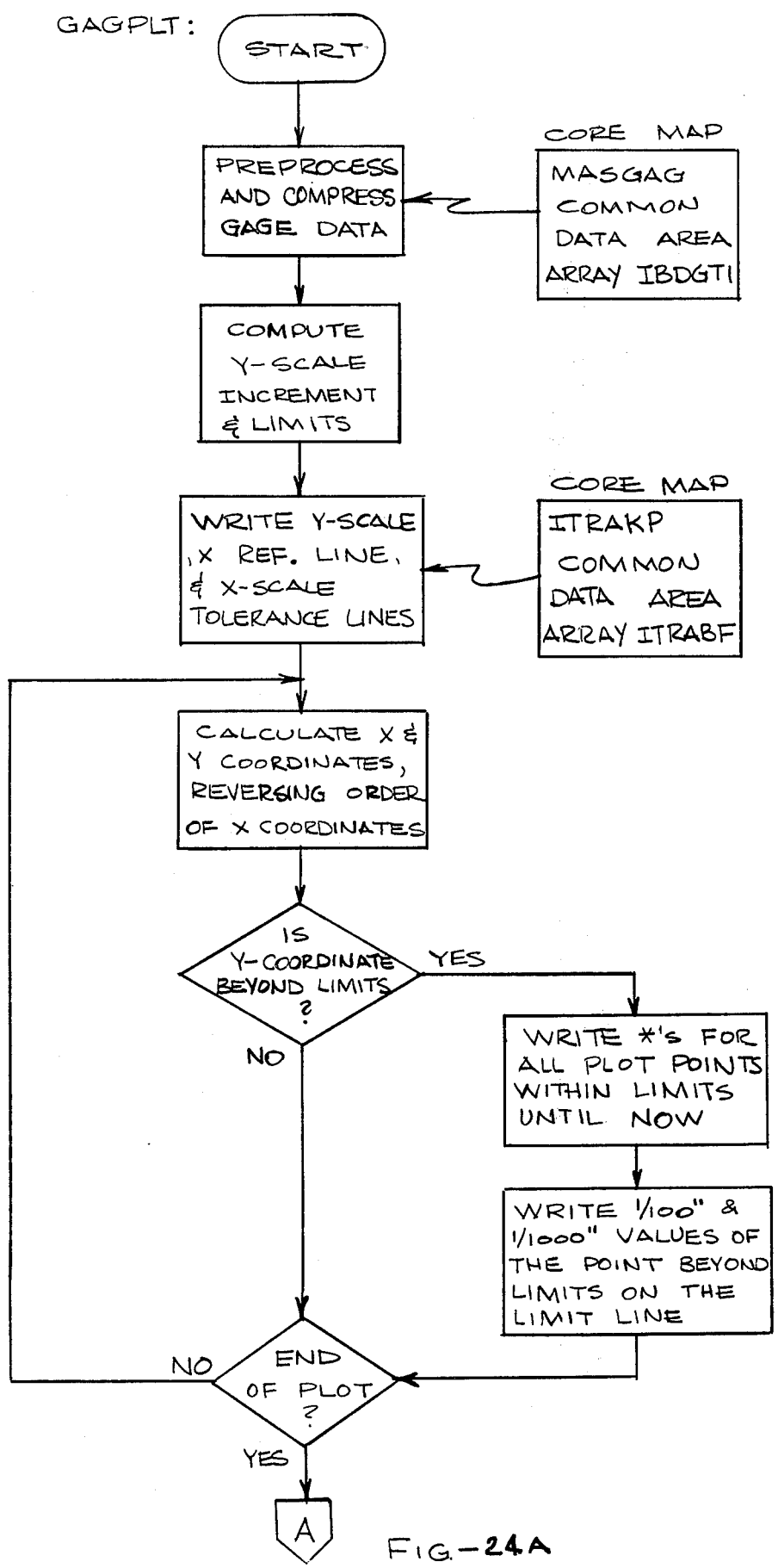
Figure 24B:
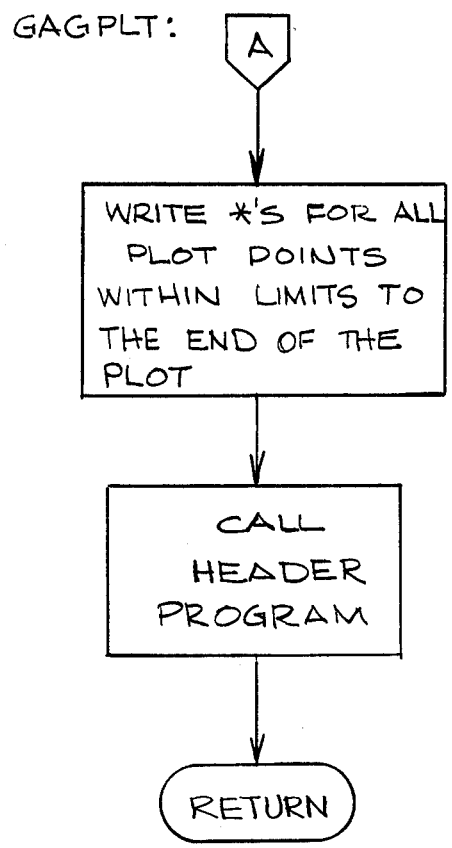

GAGPLT, see FIGS. 24A-B. This on-line program takes the 90 element profile table IBDGT1 (94) from common area MASGAG and compresses it to a 60 element table. Each table entry now represents 3 degrees. It scans the table and determines what Y-axis scale increments to use based on the maximum and minimum values in the profile table. This increment is either 0.001" or 0.002". Next, it writes the aim size tolerance lines on CRT and printing terminals 60, 63. The program then calculates the Y displacement position of each 3 degree table entry and writes a "*" on the CRT and printing terminals 60, 63 corresponding to this X and Y location. Finally, it calls the HEADER program and exits. A bar profile display using the GAGPLT program is illustrated in FIG. 3 as printout 65 from printing terminal 63.

Figure 25:
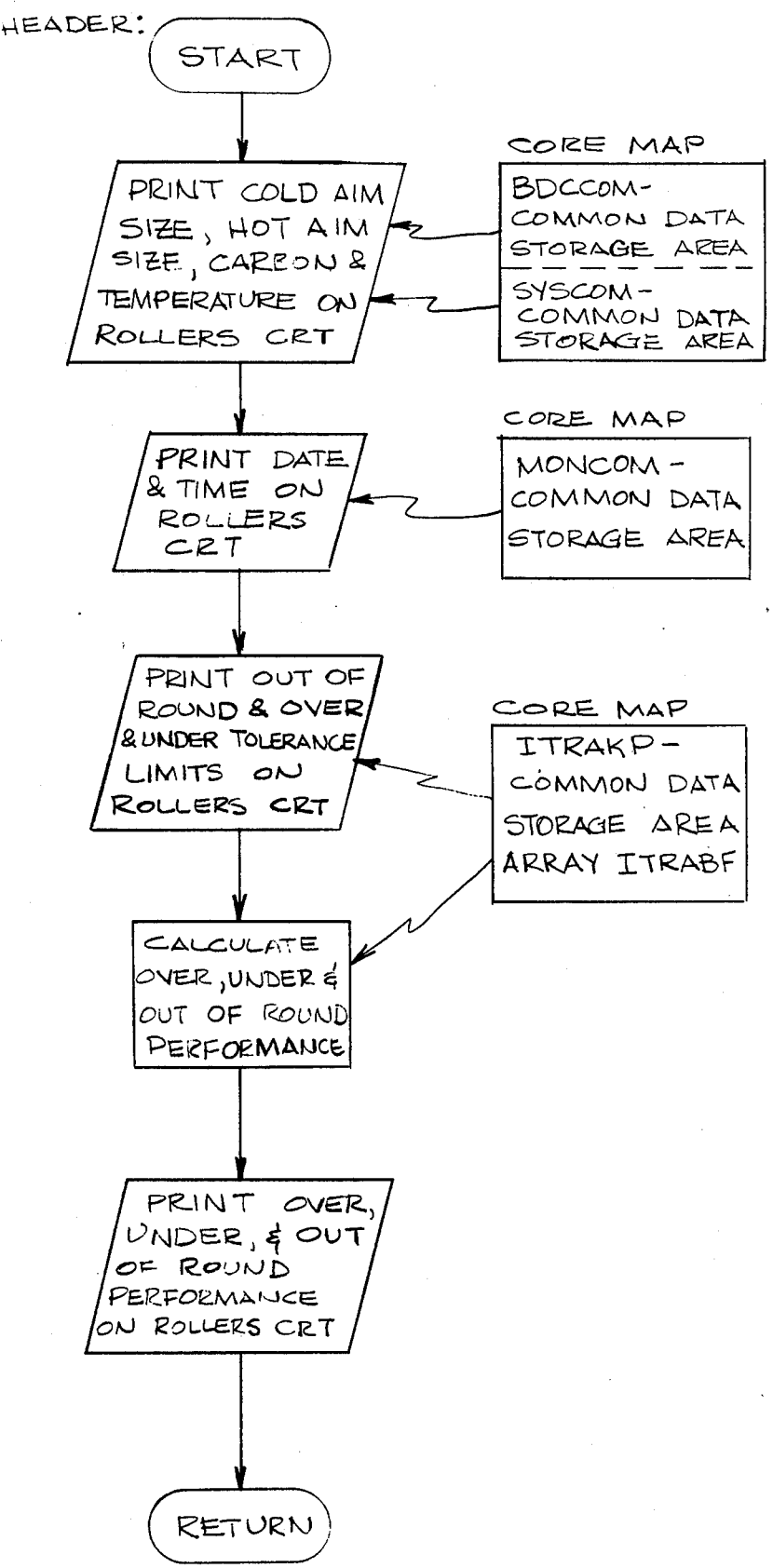

HEADER, see FIG. 25. This on-line program writes the bar cold aim size, carbon and temperature on CRT 60. Next, it writes the date, time, maximum tolerance, minimum tolerance, and out-of-round tolerance on CRT 60 also. Next, it scans the profile table IBDGT1 (94) and calculates the over, under and out-of-round performance based on the respective tolerance limits. It then prints these values and exits.

Figure 26A:
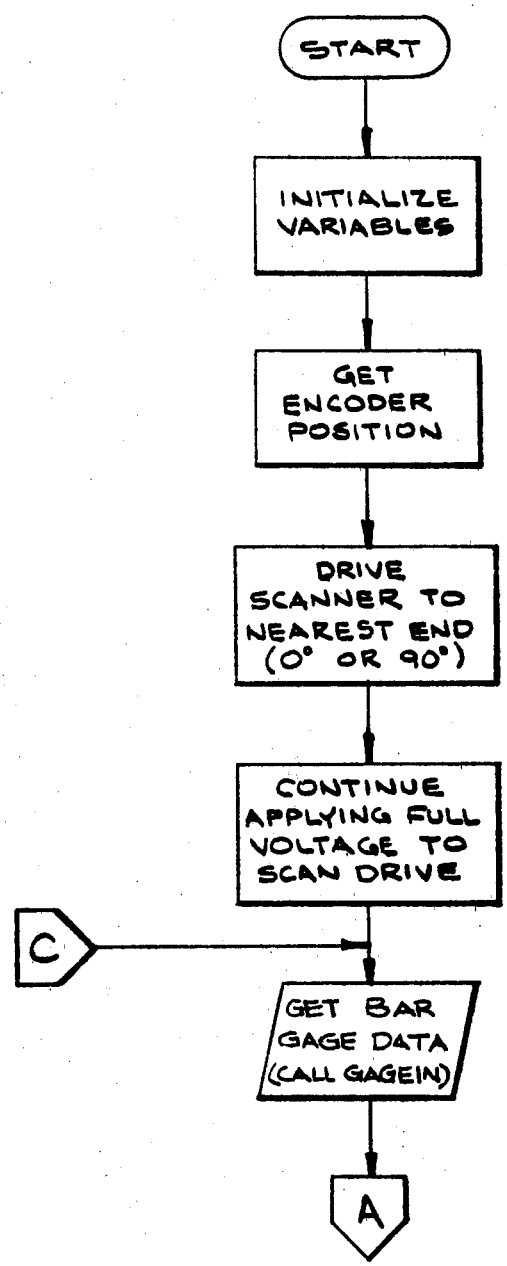
Figure 26B:
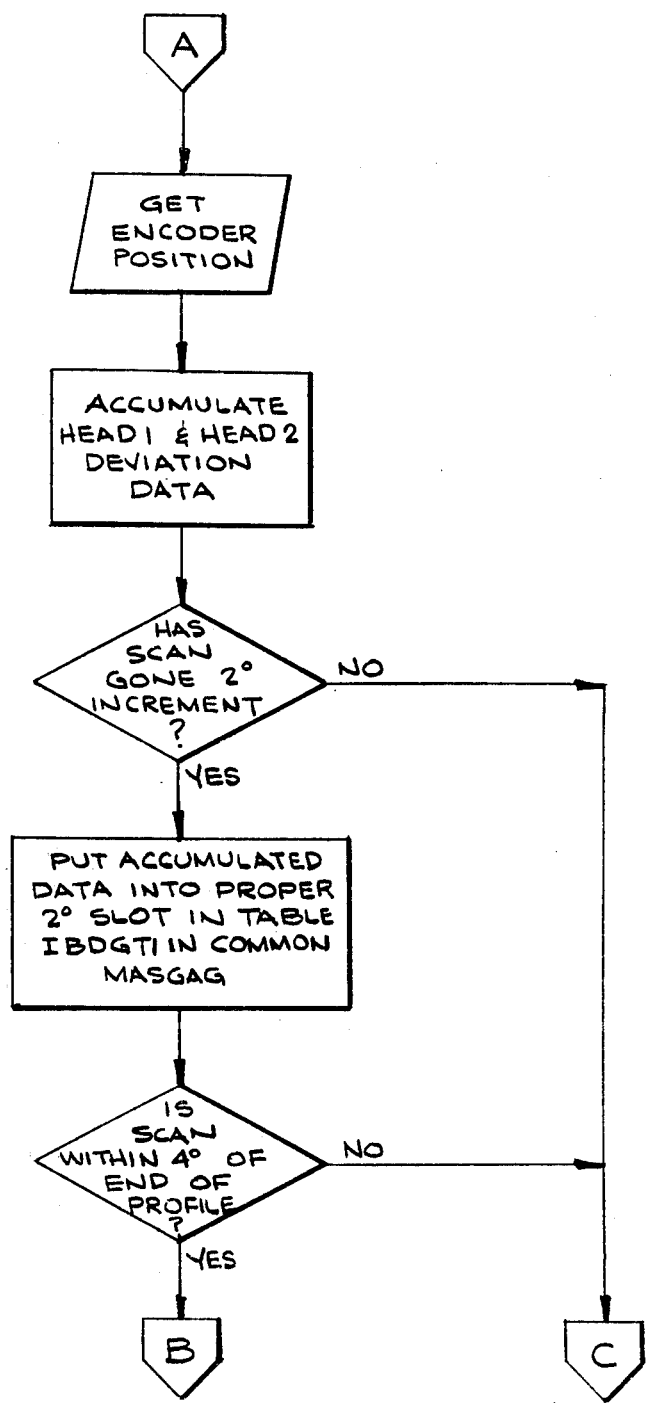
Figure 26C:
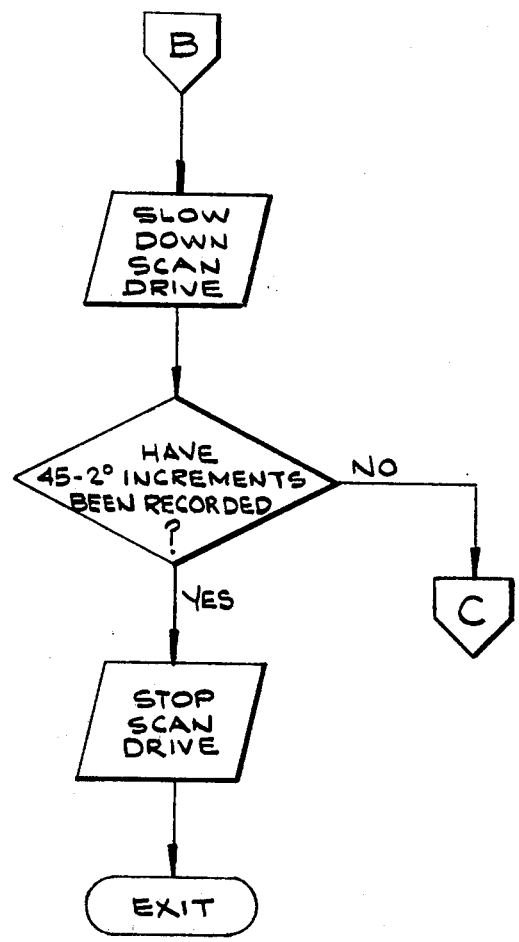
Figure 27:
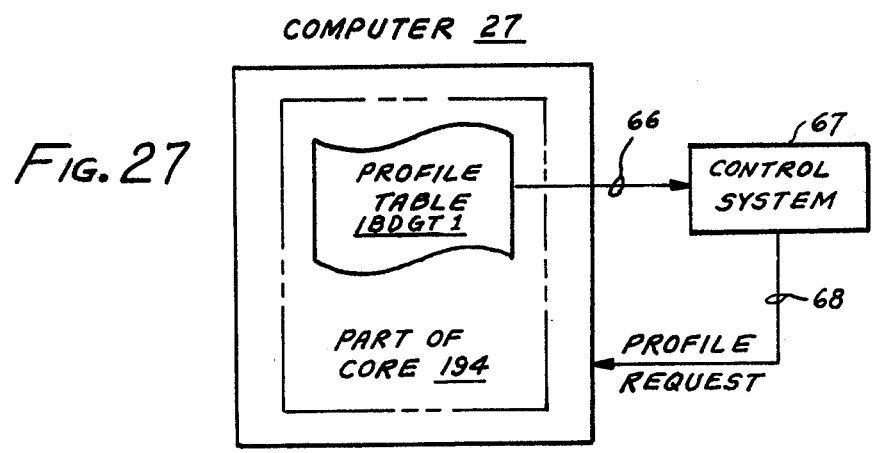
FIG. 27 is a flow chart showing the computer in FIG. 1 communicating with a control system which utilizes the profile of the present invention.

GAGPRO, see FIGS. 26A–C. This program is run under the gage on-line system. It requires no operator intervention. Its purpose is to scan the camera through a complete 90 degree cycle and build a profile table containing the deviations for each 2 degree increment IBDGT1 (94). It does not plot this data.

There are three possible error conditions generated.

1. Scan motor failure — indicates that the motor didn't start, or an end of the scan cycle was not found (0 or 90 degrees).

2. Encoder failure — generated if the ready bit was not generated by the encoder.

3. IDL failure — generated if an IDL transfer timeout occurs.

We claim:

1. A profile plotting and display system for an electro-optical system which gages two dimensions of a moving bar at various peripheral positions of the bar, comprising:
   (a) first and second electronic camera head means aimed to receive first and second images of the moving bar and generate corresponding camera signals;
   (b) scanner means adapted to scan the first and second electronic camera head means about the lateral profile of the bar a prescribed angular displacement while generating a scanner position signal;
   (c) means for controlling movement of the scanner means;
   (d) electronic circuit means including means for processing the first and second camera signals to produce corresponding first and second bar size pulses;
   (e) calculator means assimilating the first and second bar size pulses and the scanner position signal for:
      1. plotting bar profile using first and second bar size pulses and scanner position signals, and
      2. storing the bar profile data and, if desired, the first and second bar size data; and
   (f) means for utilizing the stored data to indicate and/or record bar profile and, if desired, each bar size measurement.

2. The system of claim 1 further including the electronic circuit means to include means responsive to the first and second bar size pulses for producing first and second bar centerline position data, and the calculator means is modified to receive the first and second bar centerline position data and effectively compensate the first and second bar size pulses according to a predetermined value of corresponding bar centerline position data.

3. The system of claim 2 wherein each of the first and second bar centerline position data is produced in response to detecting successive bar size pulse leading edges in respective upsweep and downsweep halves of a camera means bidirectional sweep cycle and determining the bar centerline position to be half of the distance therebetween.

4. The system of claim 1 wherein the calculator means is a programmed computer adapted to include a scanner means position control program to act on the scanner position control means in response to the scanner position signal.

5. The system of claim 1 further including a source of bar aim size data, and wherein the calculator means is a programmed computer adapted to include a profile deviation program for plotting and storing bar profile deviation from the aim size data.

6. The system of claim 5 further including a source of bar size tolerance data, and the profile deviation program is modified to overlay the bar size tolerance in the plotting and storing of bar profile deviation data.

7. A profile plotting and display system for an electro-optical system which gages two dimensions of a moving bar at various peripheral positions of the bar, comprising:
   (a) first and second electronic camera head means aimed to receive first and second images of the moving bar and generate corresponding raw camera signals, each said raw camera signal subject to one or more sources of error;
   (b) scanner means adapted to scan the first and second electronic camera head means about the lateral profile of the bar a prescribed angular displacement while generating a scanner position signal;
   (c) means for controlling movement of the scanner means;
   (d) electronic circuit means including means for processing the first and second raw camera signals to produce corresponding first and second bar size pulses, each said bar size pulses subject to a corresponding one or more sources of error;
   (e) calculator means assimilating the first and second bar size pulses, the scanner position signal and one or more error-compensating signals for:
      1. compensating each bar size pulse for one or more sources of said errors in response to at least one of said error-compensating signals, thereby producing corresponding corrected first and second bar size pulses,
      2. plotting corrected bar profile using corrected first and second bar size pulses and scanner position signals, and
      3. storing the corrected bar profile data and, if desired, the corrected first and second bar size data; and
   (f) means for utilizing the stored data to indicate and/or record bar profile and, if desired, each corrected bar size measurement.

8. The system of claim 7 wherein the calculator means is a programmed computer adapted to include a compensation program that will effectively correct each of the first and second bar size pulses for camera field-of-view in response to one or more of said error-compensating signals.

9. The system of claim 7 wherein the calculator means is a programmed computer adapted to include a compensation program that will effectively correct each of the first and second bar size pulses for offset and drift factors in response to respective error-compensating signals.

10. The system of claim 7 further including means for sensing bar temperature and producing a bar temperature signal, and wherein the calculator means is a programmed computer adapted to include a compensation program that will effectively correct each of the first and second bar size pulses to a cold bar size proportional to the bar temperature signal.

11. The system of claim 10 further including means for producing a bar composition signal, and wherein the calculator means is a programmed computer also adapted to include a compensation program that will effectively correct each of the first and second bar size pulses for bar composition effect on bar temperature correction.

12. A profile plotting and display method for an electro-optical method of gaging two dimensions of a moving bar at various peripheral positions, which method comprises:
  (a) imaging a moving bar upon first and second electronic cameras head means and generating corresponding camera signals;
  (b) scanning the lateral profile of said bar with the first and second electronic camera head means while traversing a predetermined angular displacement and generating a scanning position signal;
  (c) controlling scanning means movement;
  (d) processing the first and second camera signals to produce corresponding first and second bar size pulses which represent the two bar dimensions;
  (e) assimilating the first and second bar size pulses and the scanner position signal and calculating:
    1. a plot of bar profile using the first and second bar size pulses and the scanner means position signal, and
    2. storing the bar profile data and, if desired, the first and second bar size data; and
  (f) utilizing the stored data to indicate and/or record bar profile and, if desired, each bar size measurement.

* * * * *